(12) United States Patent
Sekine

(10) Patent No.: US 9,110,271 B2
(45) Date of Patent: Aug. 18, 2015

(54) IMAGING LENS

(71) Applicant: KANTATSU CO., LTD., Yaita-shi, Tochigi (JP)

(72) Inventor: Yukio Sekine, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

(21) Appl. No.: 14/252,828

(22) Filed: Apr. 15, 2014

(65) Prior Publication Data

US 2014/0376105 A1 Dec. 25, 2014

(30) Foreign Application Priority Data

Jun. 21, 2013 (JP) ................. 2013-130416

(51) Int. Cl.
*G02B 9/64* (2006.01)
*G02B 13/18* (2006.01)
*G02B 3/02* (2006.01)
*G02B 13/00* (2006.01)
*G02B 3/04* (2006.01)

(52) U.S. Cl.
CPC .............. *G02B 13/0045* (2013.01); *G02B 3/02* (2013.01); *G02B 3/04* (2013.01); *G02B 9/64* (2013.01)

(58) Field of Classification Search
CPC .............. G02B 3/02; G02B 3/04; G02B 9/64; G02B 13/18
USPC ................................... 359/708, 755
See application file for complete search history.

(56) References Cited

U.S. PATENT DOCUMENTS 8,599,495 B1 * 12/2013 Tsai et al. .................. 359/708

FOREIGN PATENT DOCUMENTS

JP 2010-262270 A 11/2010
JP 2012-155223 A 8/2012

* cited by examiner

*Primary Examiner* — William Choi
(74) *Attorney, Agent, or Firm* — Westerman, Hattori, Daniels & Adrian, LLP

(57) ABSTRACT

An imaging lens which uses a larger number of constituent lenses for higher performance and features a low F-value, low-profile design and a wide field of view. Designed for a solid-state image sensor, the imaging lens includes constituent lenses arranged in order from an object side to an image side: a first positive refractive power lens having a convex object-side surface; a second negative refractive power lens having a concave image-side surface; a third positive refractive power lens having a convex image-side surface; a fourth negative refractive power lens having a concave image-side surface; a fifth positive refractive power lens as a meniscus lens having a convex image-side surface; a sixth lens as a meniscus double-sided aspheric lens having a concave image-side surface near an optical axis; and a seventh negative refractive power lens as a double-sided aspheric lens having a concave image-side surface near the optical axis.

12 Claims, 16 Drawing Sheets

IMAGING LENS

The present application is based on and claims priority of Japanese patent application No. 2013-130416 filed on Jun. 21, 2013, the entire contents of which are hereby incorporated by reference.

BACKGROUND OF THE INVENTION

1. Field of the Invention

The present invention relates to imaging lenses which form an image of an object on a solid-state image sensor such as a CCD sensor or a C-MOS sensor used in a compact image pickup device. More particularly, the invention relates to imaging lenses which are built in image pickup devices mounted in highly functional products such as smart TVs and 4K TVs, information terminals such as game consoles and PCs, and mobile terminals such as smart phones, mobile phones and PDAs (Personal Digital Assistants).

2. Description of the Related Art

In recent years, highly functional products, such as a smart TV as a TV with a personal computer function and a 4K TV as a TV with four times higher resolution than a full high-definition TV, have been attracting attention. In smart TVs, the tendency toward products which are not only highly functional but also multifunctional is growing, so the smart TV market is expected to expand in the future. Some smart TVs provide a function to take video and still images through a built-in image pickup device and transmit the images through a communication network. This function can be used in various application fields: for example, a video phone and a high-precision people meter based on face recognition technology, and other various products such as a security product and a pet monitoring product which have a moving object detection function. Also, due to its high resolution, a 4K TV can reproduce an image which is so realistic as if the object were there. With the spread of smart TVs or similar products, these functions are expected to be more popular than before. On the other hand, digital photo frames with a camera function have been recently introduced into the market. Thus, the market related to cameras is expected to expand.

In communications over a video phone, for example, in a TV conference in which several people participate, the facial expression of the speaker and the surrounding scene are important information. In addition, when face recognition technology is used to recognize the faces of human beings or animals, image recognition should be highly accurate. The imaging lens used in such a high resolution product is required to have a compact lens system which provides high resolution, a wide field of view and high brightness.

However, in the conventional techniques, it is difficult to meet this demand satisfactorily. For example, the image pickup device used in a highly functional product such as a smart TV is assumed to adopt a relatively large image sensor suitable for high resolution images. If a conventional imaging lens is used in a large image sensor, since its optical system should be large, the following problem arises that various aberrations become more serious and it is very difficult to achieve the same level of high optical performance as in a small image sensor. In addition, when the lens is designed to provide a wide field of view, correction of aberrations may be very difficult, particularly in the peripheral area, regardless of image sensor size and it may be impossible to deliver satisfactory optical performance.

As an imaging lens built in an apparatus with an image pickup device, the imaging lens described in Patent Document 1 (JP-A-2010-262270) or the imaging lens described in Patent Document 2 (JP-A-2012-155223) is known.

Patent Document 1 discloses an imaging lens which includes, in order from an object side, a first lens with positive refractive power having a convex shape on the object-side surface near an optical axis, a second lens with negative refractive power, a third lens with positive refractive power having a concave shape on an image-side surface near the optical axis, a fourth lens with positive refractive power having a convex shape on the image-side surface near the optical axis, and a fifth lens with negative refractive power near the optical axis. The imaging lens described in Patent Document 1 includes five constituent lenses, each of which is optimized to deliver high performance.

Patent Document 2 discloses an imaging lens which includes, in order from an object side, a first lens group with positive refractive power, a second lens group with negative refractive power, a third lens group with positive refractive power, a fourth lens group with negative refractive power, a fifth lens group with positive refractive power, and a sixth lens group with negative refractive power. In the imaging lens described in Patent Document 2, the lens configuration of the optical system is concentric with an aperture stop so as to suppress astigmatism and coma aberrations and provide a wider field of view.

The imaging lens described in Patent Document 1 has a lens system which provides high brightness with an F-value of 2.0 and a relatively wide field of view with a half field of view of about 38 degrees. However, it cannot meet the recent demand for a wider field of view. Also, for use in a large image sensor, various aberrations must be further suppressed. However, if an imaging lens uses five constituent lenses, its ability to correct aberrations is limited and it is difficult to apply the imaging lens to a higher resolution product as mentioned above.

The imaging lens described in Patent Document 2 provides relatively high brightness with an F-value of about 2.3 and can correct aberrations properly. However, its half field of view is about 33 degrees, which means that it cannot meet the demand for a wide field of view satisfactorily. Also, if the lens configuration described in Patent Document 2 is employed to provide a wide field of view, correction of aberrations will be difficult, particularly in the peripheral area and high optical performance cannot be delivered.

As mentioned above, in the conventional arts, it is difficult to provide a sufficiently wide field of view while ensuring compactness, and meet the demand for high resolution. Also, for use in a large image sensor, it is difficult to deliver the same level of high optical performance as in a conventional small image sensor.

SUMMARY OF THE INVENTION

The present invention has been made in view of the above problem and an object thereof is to provide a high-brightness compact imaging lens which delivers higher optical performance than conventional imaging lenses when it is used not only in a conventional small image sensor but also in a large image sensor, and provides a wide field of view and can correct various aberrations properly.

A "compact" imaging lens here means an imaging lens in which the ratio of total track length TTL to the length (2ih) of the diagonal of the effective image plane of the image sensor, namely TTL/2ih is 1.0 or less. "Total track length" means the distance from the object-side surface of an optical element nearest to an object to the image plane on the optical axis in an optical system.

According to one aspect of the present invention, there is provided an imaging lens in which constituent lenses are arranged in the following order from an object side to an image side: a first lens with positive refractive power having a convex surface on the object side near an optical axis, a second lens with negative refractive power having a concave surface on the image side near the optical axis, a third lens with positive refractive power having a convex surface on the image side near the optical axis, a fourth lens with negative refractive power having a concave surface on the image side near the optical axis, a fifth lens with positive refractive power as a meniscus lens having a convex surface on the image side near the optical axis, a sixth lens as a meniscus double-sided aspheric lens having a concave surface on the image side near the optical axis, and a seventh lens with negative refractive power as a double-sided aspheric lens having a concave surface on the image side near the optical axis.

The above imaging lens includes a first lens group composed of the first and second lenses, a second lens group composed of the third and fourth lenses, a third lens group composed of a fifth lens, and a fourth lens group composed of the sixth and seventh lenses, which means that it includes four groups with seven constituent lenses in which the lens groups are arranged in order from the object side as follows: positive, positive, positive and negative lens groups or positive, negative, positive, and negative lens groups. This refractive power arrangement is effective in shortening the total track length. Also, in each of the first and second lens groups, the positive lens is located on the object side and the negative lens is located on the image side so that chromatic aberrations generated on the positive lens located on the object side are properly corrected by the negative lens located on the image side. Also, the fifth lens constituting the third group has adequate positive refractive power to keep the total track length short, and the negative sixth and seventh lenses constituting the fourth group have adequate aspheric surfaces to correct chromatic aberrations further and properly correct field curvature and distortion and control the angle of a chief ray incident on the image sensor.

The first lens is a biconvex lens in which the curvature radius of the object-side surface is smaller than the curvature radius of the image-side surface and positive refractive power is adequately distributed to both the surfaces so as to suppress spherical aberrations and provide relatively strong refractive power for compactness of the imaging lens. Alternatively the image-side surface of the first lens may be concave and in that case, it is desirable that the curvature radius of the image-side surface be larger than the curvature radius of the object-side surface to the extent that the refractive power is not too low and spherical aberrations do not increase.

The second lens is a lens with negative refractive power which has a concave surface on the image side near the optical axis and corrects spherical aberrations and chromatic aberrations properly.

The third lens is a lens with positive refractive power having a convex surface on the image side near the optical axis, which corrects field curvature and coma aberrations properly.

The fourth lens is a lens with negative refractive power having a concave surface on the image side near the optical axis, which corrects residual chromatic aberrations properly.

The fifth lens is a meniscus lens with positive refractive power having a convex surface on the image side near the optical axis, in which its positive refractive power is relatively strong among the constituent lenses of the imaging lens. Its refractive power is balanced with the positive refractive power of the first lens, contributing to the compactness of the imaging lens.

The sixth lens is a meniscus lens having a concave surface on the image side near the optical axis, which corrects residual chromatic aberrations properly. The aspheric surfaces on both the sides of the lens contribute to proper correction of coma aberrations and astigmatism.

The seventh lens is a meniscus lens with negative refractive power having a concave surface on the image side near the optical axis, which ensures an adequate back focus easily. Due to the aspheric surfaces on both the sides of the lens, its negative refractive power gradually decreases and changes to positive refractive power in the peripheral portion. This is effective mainly in correcting distortion and field curvature and controlling the angle of a chief ray incident on the image sensor.

Preferably, the imaging lens according to the present invention satisfies conditional expressions (1) and (2) below:

$$50<vd1<70 \quad (1)$$

$$20<vd2<30 \quad (2)$$

where
vd1: Abbe number of the first lens at d-ray
vd2: Abbe number of the second lens at d-ray.

The conditional expressions (1) and (2) define adequate ranges for the Abbe numbers of the first and second lenses at d-ray and indicate conditions to correct chromatic aberrations generated on the first lens properly. If the value is below the lower limit of the conditional expression (1) or the value is above the upper limit of the conditional expression (2), the difference in dispersion value between the first and second lenses would be smaller, making it impossible to correct chromatic aberrations properly. If the value is above the upper limit of the conditional expression (1) or the value is below the lower limit of the conditional expression (2), the balance between axial chromatic aberration and chromatic aberration of magnification would worsen, making it difficult to deliver the required optical performance in the peripheral portion.

Preferably, the imaging lens according to the present invention satisfies conditional expressions (3) and (4) below:

$$50<vd3<70 \quad (3)$$

$$20<vd4<30 \quad (4)$$

where
vd3: Abbe number of the third lens at d-ray
vd4: Abbe number of the fourth lens at d-ray.

The conditional expressions (3) and (4) define adequate ranges for the Abbe numbers of the third and fourth lenses at d-ray and indicate conditions to correct chromatic aberrations generated on the third lens properly. If the value is below the lower limit of the conditional expression (3) or the value is above the upper limit of the conditional expression (4), the difference in dispersion value between the third and fourth lenses would be smaller, making it impossible to correct chromatic aberrations properly. If the value is above the upper limit of the conditional expression (3) or the value is below the lower limit of the conditional expression (4), the balance between axial chromatic aberration and chromatic aberration of magnification would worsen, making it difficult to deliver the required optical performance in the peripheral portion.

Preferably, in the imaging lens according to the present invention, the object-side surface and image-side surface of the sixth lens are aspheric surfaces having a pole-change point in a position off the optical axis.

When the object-side surface of the sixth lens is an aspheric surface having a pole-change point and change in the amount of aspheric surface sag is small, the total track length can be shortened, so the imaging lens can be compact. Also, when the object-side surface and image-side surface of the sixth lens are aspheric surfaces having a pole-change point in a position off the optical axis, the lens is a meniscus lens having a convex surface on the object side near the optical axis in which as the distance from the optical axis increases, the shape of the object-side surface changes from convex to concave and the shape of the image-side surface changes from concave to convex. An aspheric surface whose shape changes in this way can effectively correct aberrations in the area from the center of the image plane to its maximum image height point. In addition, the sixth lens plays a very important role in reducing the burden on the seventh lens, located nearest to the image plane, for correction of aberrations and control of the chief ray angle.

Preferably, in the imaging lens according to the present invention, the image-side surface of the seventh lens is an aspheric surface having a pole-change point in a position off the optical axis.

The image-side surface of the seventh lens is an aspheric surface having a pole-change point in a position off the optical axis and has a concave shape near the optical axis and its shape changes to convex as the distance from the optical axis increases. This aspheric shape mainly makes final correction of distortion and field curvature easy and also makes control of the chief ray angle easy, preventing a decline in relative illumination in the peripheral portion. In the present invention, a "pole-change point" means a point on an aspheric surface at which a tangential plane intersects the optical axis perpendicularly.

Preferably, the imaging lens according to the present invention satisfies a conditional expression (5) below:

$$0.6 < TTL/2ih < 1.0 \tag{5}$$

where
TTL: distance on the optical axis from an object-side surface of an optical element located nearest to the object to an image plane without a filter, etc.
ih: maximum image height.

The conditional expression (5) defines an adequate range for the ratio of total track length to maximum image height of the imaging lens and indicates a condition to achieve compactness and high imaging performance. If the value is above the upper limit of the conditional expression (5), the total track length would be too long, making it difficult to achieve compactness. On the other hand, if the value is below the lower limit of the conditional expression (5), it would be easier to achieve compactness but the total track length would be too short, making it difficult that the constituent lenses of the imaging lens have optimum shapes. As a consequence, it would be difficult to create a configuration capable of correcting aberrations properly, leading to deterioration in optical performance.

More preferably, the imaging lens according to the present invention satisfies a conditional expression (5a) below:

$$0.6 < TTL/2ih < 0.9. \tag{5a}$$

Preferably, the imaging lens according to the present invention satisfies a conditional expression (6) below:

$$0.85 < \Sigma d/f < 1.25 \tag{6}$$

where
f: focal length of the overall optical system of the imaging lens
$\Sigma d$: distance on the optical axis from the object-side surface of the first lens to the image-side surface of the seventh lens.

The conditional expression (6) indicates a condition to shorten the total track length and correct aberrations properly. If the value is above the upper limit of the conditional expression (6), the back focus would be too short and it would be difficult to provide space for a filter or the like, leading to a longer total track length. On the other hand, if the value is below the lower limit of the conditional expression (6), it would be difficult for each constituent lens of the imaging lens to have the required thickness. In addition, the distance between constituent lenses would be smaller, which might restrict the freedom of aspheric shape design. As a consequence, it would be difficult to correct aberrations properly, making it difficult to deliver high optical performance. The imaging lens according to the present invention includes seven constituent lenses, namely a larger number of constituent lenses than conventional imaging lenses, and an air gap is provided between constituent lenses. Therefore, generally this configuration is considered as disadvantageous in achieving compactness, but when the value falls within the range defined by the conditional expression (6), the imaging lens can be as compact as, or more compact than, conventional imaging lenses composed of five or six constituent lenses.

More preferably, the imaging lens according to the present invention satisfies a conditional expression (6a) below:

$$0.95 < \Sigma d/f < 1.25. \tag{6a}$$

Preferably, the imaging lens according to the present invention satisfies a conditional expression (7) below:

$$0.8 < ih/f < 1.2 \tag{7}$$

where
f: focal length of the overall optical system of the imaging lens
ih: maximum image height.

The conditional expression (7) defines an adequate range for the ratio of the focal length of the overall optical system of the imaging lens to maximum image height and indicates a condition to provide a wide field of view and deliver high imaging performance. If the value is above the upper limit of the conditional expression (7), the field of view would be too wide to correct aberrations properly, leading to deterioration in optical performance. On the other hand, if the value is below the lower limit of the conditional expression (7), the focal length of the overall optical system of the imaging lens would be too long to achieve compactness, offering a disadvantage in providing a wide field of view.

Preferably, the imaging lens according to the present invention satisfies conditional expressions (8) and (9) below:

$$0.7 < f1/f < 1.5 \tag{8}$$

$$-5.0 < f2/f < -1.0 \tag{9}$$

where
f: focal length of the overall optical system of the imaging lens
f1: focal length of the first lens
f2: focal length of the second lens.

The conditional expression (8) defines an adequate range for the ratio of the focal length of the first lens to the focal length of the overall optical system of the imaging lens and indicates a condition to achieve compactness of the imaging lens and correct spherical aberrations and coma aberrations properly. If the value is above the upper limit of the conditional expression (8), the positive refractive power of the first lens would be too weak to achieve compactness of the imaging lens. On the other hand, if the value is below the lower limit of the conditional expression (8), the positive refractive power of the first lens would be too strong to correct spherical aberrations and coma aberrations properly.

The conditional expression (9) defines an adequate range for the ratio of the focal length of the second lens to the focal length of the overall optical system of the imaging lens and indicates a condition to achieve compactness of the imaging lens and correct chromatic aberrations properly. If the value is above the upper limit of the conditional expression (9), the negative refractive power of the second lens would be too strong to achieve compactness of the imaging lens. Also, axial and off-axial chromatic aberrations would be excessively corrected, making it difficult to deliver high imaging performance. On the other hand, if the value is below the lower limit of the conditional expression (9), the negative refractive power of the second lens would be too weak to correct axial and off-axial chromatic aberrations properly. In this case as well, it would be difficult to deliver high imaging performance.

Preferably, the imaging lens according to the present invention satisfies a conditional expression (10) below:

$$2.0 < |f34/f| \qquad (10)$$

where
f: focal length of the overall optical system of the imaging lens
f34: composite focal length of the third lens and the fourth lens.

The conditional expression (10) defines an adequate range for the ratio of the composite focal length of the third and fourth lenses to the focal length of the overall optical system of the imaging lens and indicates a condition to correct astigmatism and coma aberrations properly. If the value is below the lower limit of the conditional expression (10), the composite refractive power of the third and fourth lenses would be too strong to correct astigmatism and coma aberrations properly.

Preferably, the imaging lens according to the present invention satisfies conditional expressions (11) and (12) below:

$$0.6 < f5/f < 1.2 \qquad (11)$$

$$-1.2 < f67/f < -0.6 \qquad (12)$$

where
f: focal length of the overall optical system of the imaging lens
f5: focal length of the fifth lens
f67: composite focal length of the sixth lens and the seventh lens.

The conditional expression (11) defines an adequate range for the ratio of the focal length of the fifth lens to the focal length of the overall optical system of the imaging lens and indicates a condition to achieve compactness of the imaging lens and correct coma aberrations and axial chromatic aberrations properly. If the value is above the upper limit of the conditional expression (11), the positive refractive power of the fifth lens would be too weak to achieve compactness of the imaging lens. On the other hand, if the value is below the lower limit of the conditional expression (11), the positive refractive power of the fifth lens would be too strong to correct coma aberrations and axial chromatic aberrations properly.

The conditional expression (12) indicates a condition to keep the total track length short, deliver the required performance and ensure an adequate back focus. If the value is above the upper limit of the conditional expression (12), the composite negative refractive power of the sixth and seventh lenses would be too weak to ensure an adequate back focus. On the other hand, if the value is below the lower limit of the conditional expression (12), the composite negative refractive power of the sixth and seventh lenses would be too strong to keep the total track length short.

More preferably, the imaging lens according to the present invention satisfies conditional expressions (11a) and (12a) below:

$$0.75 < f5/f < 1.05 \qquad (11a)$$

$$-1.1 < f67/f < -0.7. \qquad (12a)$$

Preferably, the imaging lens according to the present invention satisfies conditional expressions (13), (14), and (15) below:

$$50 < vd5 < 70 \qquad (13)$$

$$20 < vd6 < 30 \qquad (14)$$

$$50 < vd7 < 70 \qquad (15)$$

where
vd5: Abbe number of the fifth lens at d-ray
vd6: Abbe number of the sixth lens at d-ray
vd7: Abbe number of the seventh lens at d-ray.

The conditional expressions (13), (14), and (15) define adequate ranges for the Abbe numbers of the fifth, sixth, and seventh lenses, respectively and indicate conditions to correct chromatic aberrations properly. If these lenses, namely the three lenses nearer to the image plane among the seven constituent lenses, satisfy the respective conditional expressions, it means that the lenses made of low-dispersion material and high-dispersion material are arranged alternately and consequently axial chromatic aberrations and chromatic aberrations of magnification occurred on the image plane side in the lens system can be corrected more properly.

In addition, it is desirable that all the constituent lenses of the imaging lens according to the present invention be made of plastic material. In that case, the imaging lens can be mass-produced, for example, by injection molding and cost reduction can be achieved.

Furthermore, it is desirable that in the imaging lens according to the present invention, no cemented lens be used and an air gap be provided between constituent lenses. This configuration makes it possible to form aspheric surfaces on all the constituent lens surfaces so that various aberrations can be corrected more properly.

DETAILED DESCRIPTION OF THE PREFERRED EMBODIMENTS

Hereinafter, a preferred embodiment of the present invention will be described in detail referring to the accompanying drawings.

FIGS. 1, 3, 5, 7, 9, 11, 13, and 15 are schematic views showing the general configurations of the imaging lenses according to Examples 1 to 8 of this embodiment respectively. Since all these examples have the same basic configuration, the configuration of an imaging lens according to this embodiment is explained below mainly referring to the schematic view of Example 1.

Figure 1:
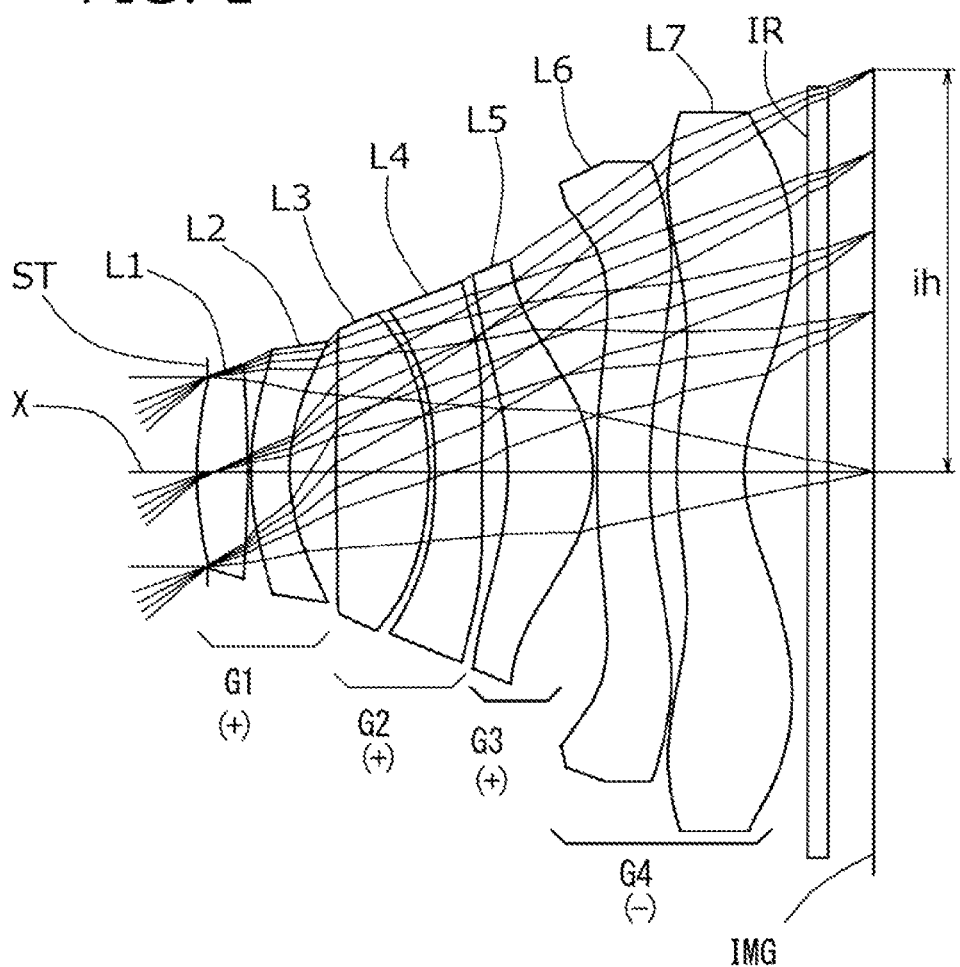
FIG. 1 is a schematic view showing the general configuration of an imaging lens in Example 1.

As shown in FIG. 1, in the imaging lens according to the present invention, elements are arranged in the following order from an object side to an image side: a first lens L1 with positive refractive power having a convex surface on the object side near an optical axis X, a second lens L2 with negative refractive power having a concave surface on the image side near the optical axis X, a third lens L3 with positive refractive power having a convex surface on the image side near the optical axis X, a fourth lens L4 with negative refractive power having a concave surface on the image side near the optical axis X, a fifth lens L5 with positive refractive power as a meniscus lens having a convex surface on the image side near the optical axis X, a sixth lens L6 as a meniscus double-sided aspheric lens having a concave surface on the image side near the optical axis X, and a seventh lens L7 with negative refractive power as a double-sided aspheric lens having a concave surface on the image side near the optical axis X. An aperture stop ST is located on the object side of the first lens L1. Alternatively, the aperture stop ST may be located between the first lens L1 and the second lens L2 as shown in Example 6.

A filter IR is located between the seventh lens L7 and an image plane IMG. This filter IR is omissible. In the present invention, the total track length is evaluated without the filter IR.

The above imaging lens includes four lens groups, namely a first group G1 composed of the first lens L1 and the second lens L2 having positive composite refractive power, a second group G2 composed of the third lens L3 and the fourth lens L4 having positive composite refractive power, a third group G3 composed of the fifth lens L5 having positive refractive power, and a fourth group G4 composed of the sixth lens L6 and the seventh lens L7 having negative composite refractive power so that the refractive power arrangement contributes to a shorter total track length. Alternatively, the second group G2 may have weak negative composite refractive power as shown in Example 4. In each of the first group G1 and the second group G2, the positive lens is located nearer to the object and the negative lens is located nearer to the image plane so that chromatic aberrations generated on the positive lens located nearer to the object are properly corrected by the negative lens located nearer to the image plane. The fifth lens L5 which constitutes the third group G3 has adequate positive refractive power to keep the total track length short and the negative sixth lens L6 and the negative seventh lens L7 which constitute the fourth group G4 have adequate aspheric surfaces to further correct chromatic aberrations and properly correct field curvature and distortion and control the angle of a chief ray incident on the image sensor.

The first lens L1 is a biconvex lens in which the curvature radius of the object-side surface is smaller than the curvature radius of the image-side surface and positive refractive power is adequately distributed to both the surfaces so as to suppress spherical aberrations and provide relatively strong refractive power to achieve compactness of the imaging lens. Alternatively, the image-side surface of the first lens L1 may be concave as shown in Example 4 and in that case, it is desirable that the curvature radius of the image-side surface be larger than the curvature radius of the object-side surface to the extent that the refractive power is not too low and spherical aberrations do not increase.

The second lens L2 is a lens with negative refractive power which has a concave surface on the image side near the optical axis X and corrects spherical aberrations and chromatic aberrations properly.

The third lens L3 is a lens with positive refractive power having a convex surface on the image side near the optical axis X, which corrects field curvature and coma aberrations properly.

The fourth lens L4 is a lens with negative refractive power having a concave surface on the image side near the optical axis X, which corrects residual chromatic aberrations properly.

The fifth lens L5 is a meniscus lens with positive refractive power having a convex surface on the image side near the optical axis X, which has relatively strong positive refractive power. Its refractive power is adequately balanced with the positive refractive power of the first lens L1 so that the imaging lens is compact.

The sixth lens L6 is a meniscus lens having a concave surface on the image side near the optical axis X, which also corrects residual chromatic aberrations properly. The aspheric surfaces on both the sides of the lens correct coma aberrations and astigmatism properly.

The seventh lens L7 is a meniscus lens with negative refractive power having a concave surface on the image side near the optical axis x, which ensures an adequate back focus easily. Due to the aspheric surfaces on both the sides of the lens, the negative refractive power of the seventh lens L7 decreases toward the peripheral portion of the lens and changes to positive refractive power in the peripheral portion. This is effective mainly in correcting distortion and field curvature and controlling the angle of a chief ray incident on the image sensor.

The imaging lens according to the present invention satisfies conditional expressions (1) to (15) below:

$$50 < vd1 < 70 \tag{1}$$

$$20 < vd2 < 30 \tag{2}$$

$$50 < vd3 < 70 \tag{3}$$

$$20 < vd4 < 30 \tag{4}$$

$$0.6 < TTL/2ih < 1.0 \tag{5}$$

$$0.85 < \Sigma d/f < 1.25 \tag{6}$$

$$0.8 < ih/f < 1.2 \tag{7}$$

$$0.7 < f1/f < 1.5 \tag{8}$$

$$-5.0 < f2/f < -1.0 \tag{9}$$

$2.0 < |f34/f|$ (10)

$0.6 < f5/f < 1.2$ (11)

$-1.2 < f67/f < -0.6$ (12)

$50 < vd5 < 70$ (13)

$20 < vd6 < 30$ (14)

$50 < vd7 < 70$ (15)

where
vd1: Abbe number of the first lens L1 at d-ray
vd2: Abbe number of the second lens L2 at d-ray
vd3: Abbe number of the third lens L3 at d-ray
vd4: Abbe number of the fourth lens L4 at d-ray
TTL: distance on the optical axis X from the objet-side surface of an optical element located nearest to the object to the image plane IMG without the filter IR, etc.
ih: maximum image height
f: focal length of the overall optical system of the imaging lens
Σd: distance on the optical axis X from the object-side surface of the first lens L1 to the image-side surface of the seventh lens L7
f1: focal length of the first lens L1
f2: focal length of the second lens L2
f34: composite focal length of the third lens L3 and the fourth lens L4
f5: focal length of the fifth lens L5
f67: composite focal length of the sixth lens L6 and the seventh lens L7
vd5: Abbe number of the fifth lens L5 at d-ray
vd6: Abbe number of the sixth lens L6 at d-ray
vd7: Abbe number of the seventh lens L7 at d-ray.

In this embodiment, all the lens surfaces are aspheric. The aspheric shapes of these lens surfaces are expressed by the following equation, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, the imaging lenses in examples according to this embodiment will be explained. In each example, f denotes the focal length of the overall optical system of the imaging lens, Fno denotes an F-number, ω denotes a half field of view, ih denotes a maximum image height, and TTL denotes a total track length. i denotes a surface number counted from the object side, r denotes a curvature radius, d denotes the distance between lens surfaces on the optical axis X (surface distance), Nd denotes a refractive index with respect to d-ray (reference wavelength), and vd denotes an Abbe number with respect to d-ray. As for aspheric surfaces, an asterisk (*) after surface number i indicates that the surface concerned is an aspheric surface.

EXAMPLE 1

The basic lens data of Example 1 is shown below in Table 1.

TABLE 1

Example 1
in mm f = 6.76
Fno = 2.40
ω(°) = 41.2
ih = 5.99
TTL = 9.97

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.15 | | |
| 2* | 5.902 | 0.760 | 1.5438 | 55.57 |
| 3* | −13.378 | 0.040 | | |
| 4* | 4.196 | 0.576 | 1.6142 | 25.58 |
| 5* | 2.657 | 0.692 | | |
| 6* | 28.468 | 1.381 | 1.5438 | 55.57 |
| 7* | −5.000 | 0.093 | | |
| 8* | −7.763 | 0.700 | 1.6142 | 25.58 |
| 9* | 36.656 | 0.389 | | |
| 10* | −4.775 | 1.270 | 1.5346 | 56.16 |
| 11* | −1.976 | 0.053 | | |
| 12* | 14.503 | 0.790 | 1.6142 | 25.58 |
| 13* | 7.785 | 0.402 | | |
| 14* | 6.1147 | 1.000 | 1.5346 | 56.16 |
| 15* | 2.1731 | 0.800 | | |
| 16 | Infinity | 0.300 | 1.5640 | 51.30 |
| 17 | Infinity | 0.834 | | |
| Image Plane | Infinity | | | |

TABLE 1-continued

Example 1
in mm

Constituent Lens Data

| Lens | Start Surface | Focal Length |
|---|---|---|
| 1 | 2 | 7.64 |
| 2 | 4 | −13.74 |
| 3 | 6 | 7.94 |
| 4 | 8 | −10.37 |
| 5 | 10 | 5.45 |
| 6 | 12 | −28.64 |
| 7 | 14 | −6.92 |

| Lens | Composite Focal Length |
|---|---|
| Third Lens-Fourth Lens | 30.08 |
| Sixth Lens-Seventh Lens | −5.43 |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 4.733E−04 | 7.844E−03 | −1.319E−02 | −2.924E−02 | −2.453E−03 | −1.052E−03 | −1.594E−02 |
| A6 | −1.803E−04 | 5.631E−04 | 5.781E−03 | 7.339E−03 | −1.303E−03 | −1.235E−03 | 1.226E−03 |
| A8 | −1.476E−04 | −1.398E−03 | −2.083E−03 | −1.724E−03 | 3.330E−04 | 7.037E−05 | 1.055E−04 |
| A10 | 2.594E−05 | 2.751E−04 | 2.493E−04 | 1.331E−04 | 0.000E+00 | 0.000E+00 | −1.756E−05 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −2.678E+00 | 0.000E+00 | 0.000E+00 | 0.000E+00 | −4.569E+00 |
| A4 | −1.427E−02 | 3.293E−03 | −8.922E−03 | 7.763E−04 | −2.354E−03 | −1.419E−02 | −7.740E−03 |
| A6 | 1.694E−03 | 1.077E−03 | 1.393E−03 | −4.500E−04 | −1.456E−04 | 5.646E−04 | 4.746E−04 |
| A8 | −1.569E−04 | −1.025E−04 | 9.563E−05 | 2.340E−05 | 3.430E−06 | 6.271E−06 | −2.000E−05 |
| A10 | 8.620E−06 | 2.582E−06 | −1.118E−05 | −2.545E−06 | −1.713E−07 | −9.263E−07 | 4.987E−07 |
| A12 | 0.000E+00 | 0.000E+00 | −6.577E−07 | 1.037E−07 | 2.734E−08 | 1.374E−08 | −8.500E−09 |
| A14 | 0.000E+00 | 0.000E+00 | 6.246E−08 | 0.000E+00 | −7.675E−10 | 2.642E−10 | 9.622E−11 |
| A16 | 0.000E+00 | 0.000E+00 | 0.000E+00 | 0.000E+00 | 0.000E+00 | −6.317E−12 | 0.000E+00 |

As shown in Table 9, the imaging lens in Example 1 satisfies all the conditional expressions (1) to (15).

Figure 2:
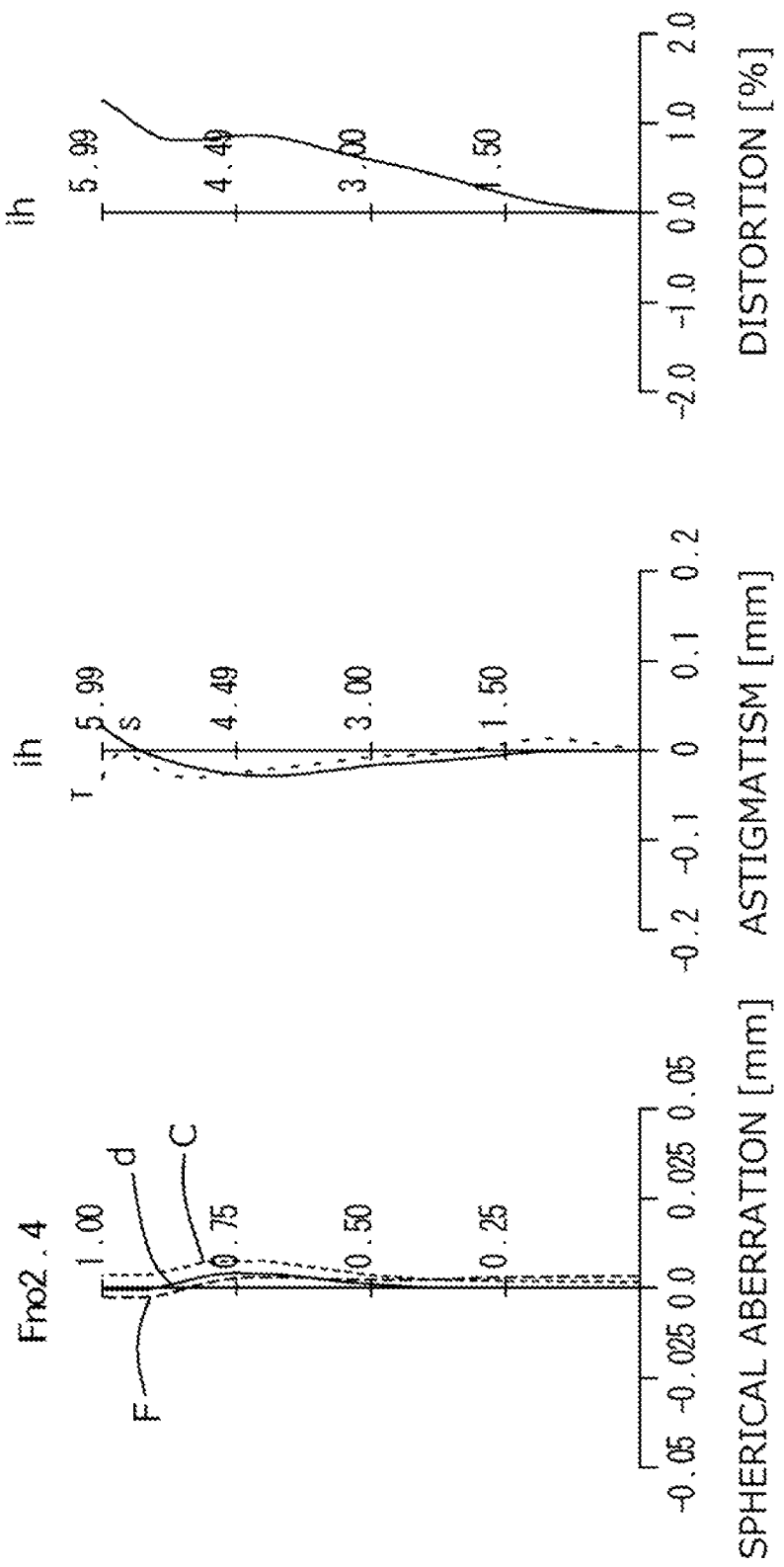
FIG. 2 shows spherical aberration, astigmatism, and distortion of the imaging lens in Example 1.
Figure 3:
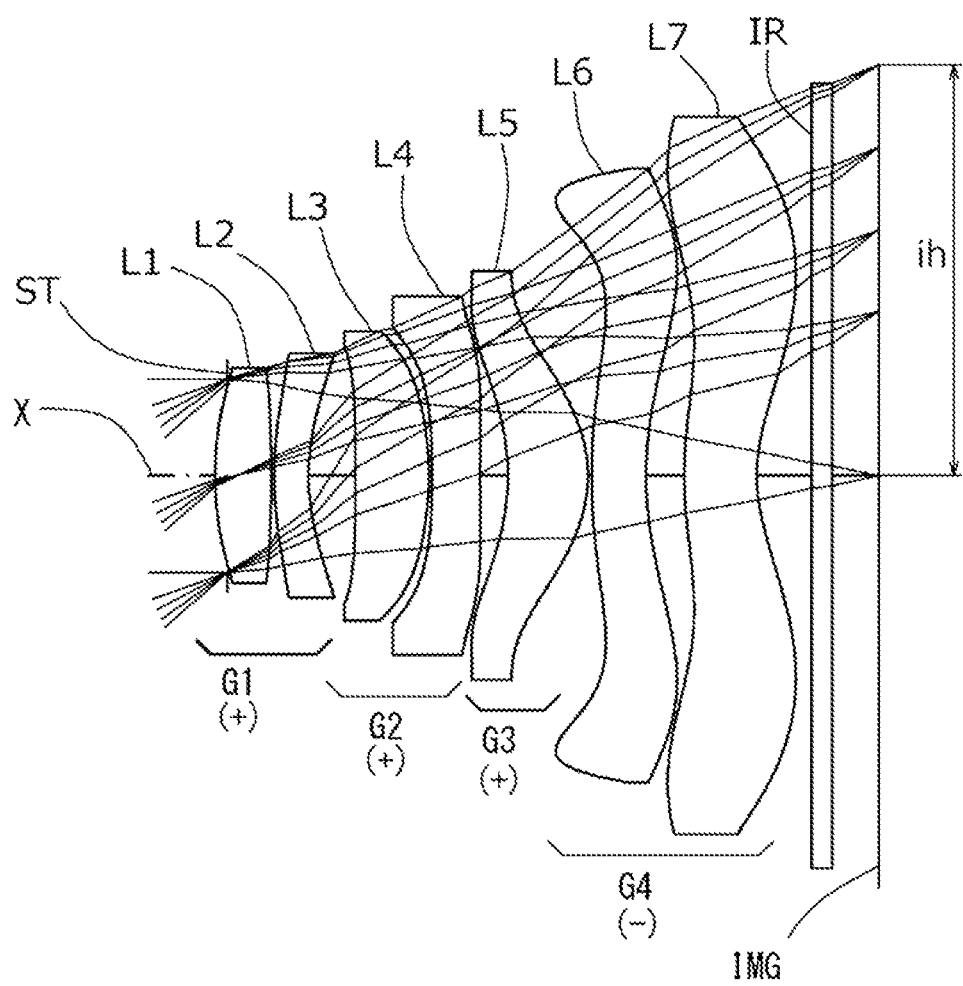
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration on sagittal image surface S and the amount of aberration on tangential image surface T (the same is true for FIGS. 4, 6, 8, 10, 12, 14, and 16). As shown in FIG. 2, each aberration is properly corrected.

The imaging lens provides a wide field of view of 80 degrees or more and high brightness with an F-value of 2.4. The ratio of total track length TTL to maximum image height ih (TTL/2ih) is 0.83, so it achieves compactness though it uses seven constituent lenses.

EXAMPLE 2

The basic lens data of Example 2 is shown below in Table 2.

TABLE 2

Example 2
in mm f = 6.76
Fno = 2.40
ω(°) = 41.2
ih = 5.99
TTL = 9.57

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.185 | | |
| 2* | 4.594 | 0.823 | 1.5438 | 55.57 |

TABLE 2-continued

Example 2
in mm

| | | | | |
|---|---|---|---|---|
| 3* | −16.373 | 0.040 | | |
| 4* | 5.408 | 0.500 | 1.6142 | 25.58 |
| 5* | 3.185 | 0.681 | | |
| 6* | −96.794 | 1.070 | 1.5346 | 56.16 |
| 7* | −5.000 | 0.050 | | |
| 8* | −13.759 | 0.700 | 1.6142 | 25.58 |
| 9* | 25.844 | 0.402 | | |
| 10* | −3.482 | 1.170 | 1.5346 | 56.16 |
| 11* | −1.955 | 0.053 | | |
| 12* | 9.153 | 0.790 | 1.6142 | 25.58 |
| 13* | 5.035 | 0.558 | | |
| 14* | 5.922 | 1.055 | 1.5346 | 56.16 |
| 15* | 2.448 | 0.700 | | |
| 16 | Infinity | 0.300 | 1.5640 | 51.30 |
| 17 | Infinity | 0.786 | | |
| Image Plane | Infinity | | | |

Constituent Lens Data

| Lens | Start Surface | Focal Length |
|---|---|---|
| 1 | 2 | 6.69 |
| 2 | 4 | −13.80 |
| 3 | 6 | 9.82 |
| 4 | 8 | −14.52 |
| 5 | 10 | 6.58 |
| 6 | 12 | −19.65 |
| 7 | 14 | −8.73 |

| Lens | Composite Focal Length |
|---|---|
| Third Lens-Fourth Lens | 29.34 |
| Sixth Lens-Seventh Lens | −5.79 |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | −5.727E−04 | 5.079E−03 | −1.136E−02 | −2.352E−02 | −5.571E−03 | −1.838E−03 | −1.684E−02 |
| A6 | −9.186E−04 | −9.582E−04 | 4.624E−03 | 5.871E−03 | −1.228E−03 | −2.322E−03 | 1.436E−04 |
| A8 | 1.113E−04 | −1.166E−03 | −2.286E−03 | −1.751E−03 | −1.266E−04 | −1.902E−05 | −3.751E−04 |
| A10 | −1.114E−04 | 1.777E−04 | 3.469E−04 | 1.681E−04 | 0.000E+00 | 0.000E+00 | 5.333E−05 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −2.608E+00 | 0.000E+00 | 0.000E+00 | 0.000E+00 | −5.026E+00 |
| A4 | −1.445E−02 | 2.918E−03 | −1.281E−02 | −5.078E−04 | −5.777E−03 | −1.507E−02 | −8.309E−03 |
| A6 | 9.193E−04 | 2.119E−03 | 2.149E−03 | −5.507E−04 | −1.324E−04 | 5.716E−04 | 4.648E−04 |
| A8 | −1.649E−04 | −2.564E−05 | 1.211E−04 | 1.930E−05 | 4.101E−06 | 7.109E−06 | −1.959E−05 |
| A10 | 2.366E−05 | −7.078E−06 | −1.420E−05 | −2.678E−06 | −1.940E−07 | −9.253E−07 | 5.065E−07 |
| A12 | 0.000E+00 | 0.000E+00 | −9.250E−07 | 1.477E−07 | 2.571E−08 | 1.295E−08 | −7.576E−09 |
| A14 | 0.000E+00 | 0.000E+00 | 6.974E−08 | 0.000E+00 | −7.787E−10 | 2.428E−10 | 6.471E−11 |
| A16 | 0.000E+00 | 0.000E+00 | 0.000E+00 | 0.000E+00 | 0.000E+00 | −5.500E−12 | 0.000E+00 |

As shown in Table 9, the imaging lens in Example 2 satisfies all the conditional expressions (1) to (15).

Figure 4:
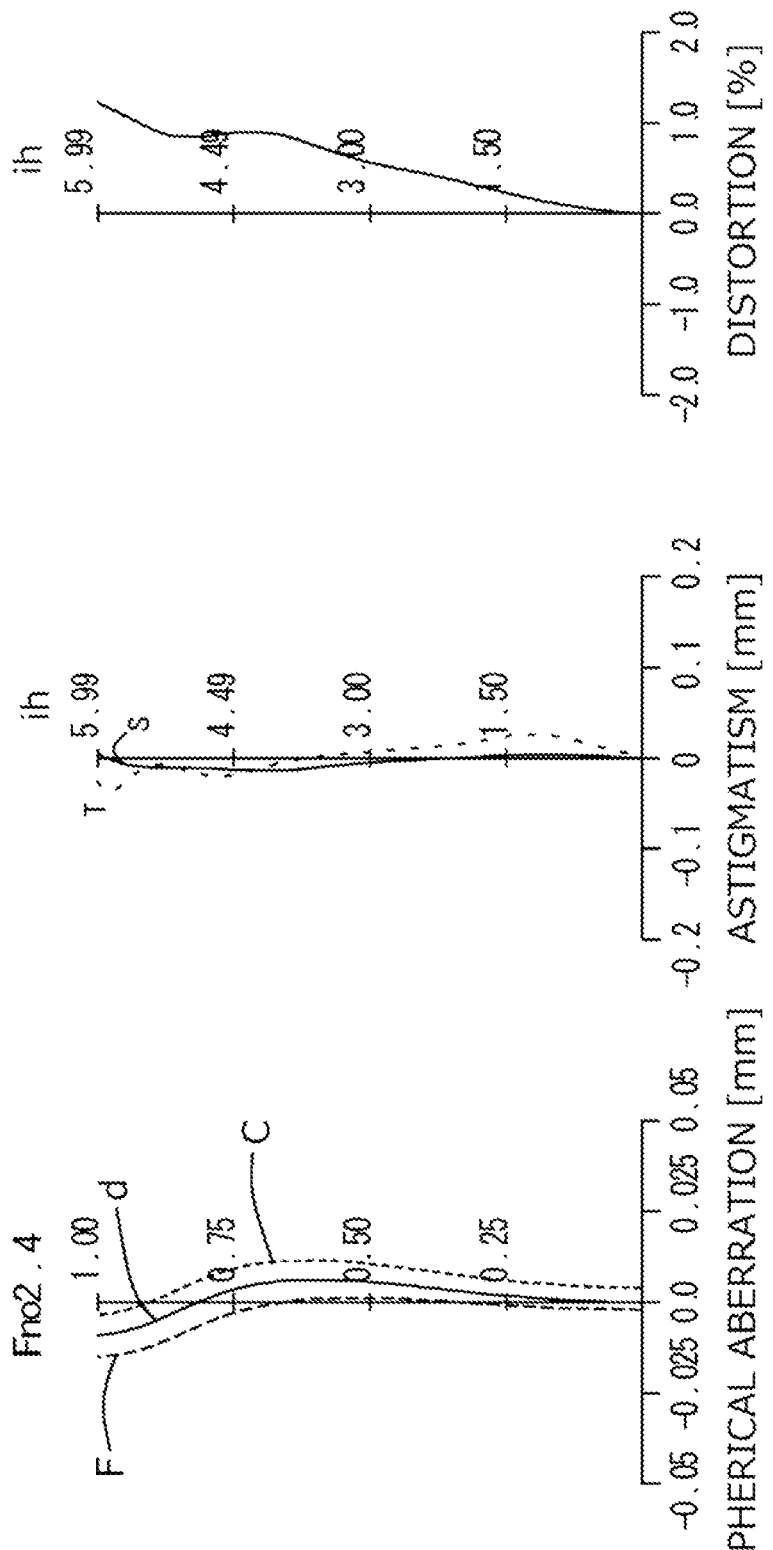
FIG. 4 shows spherical aberration, astigmatism, and distortion of the imaging lens in Example 2.
Figure 5:
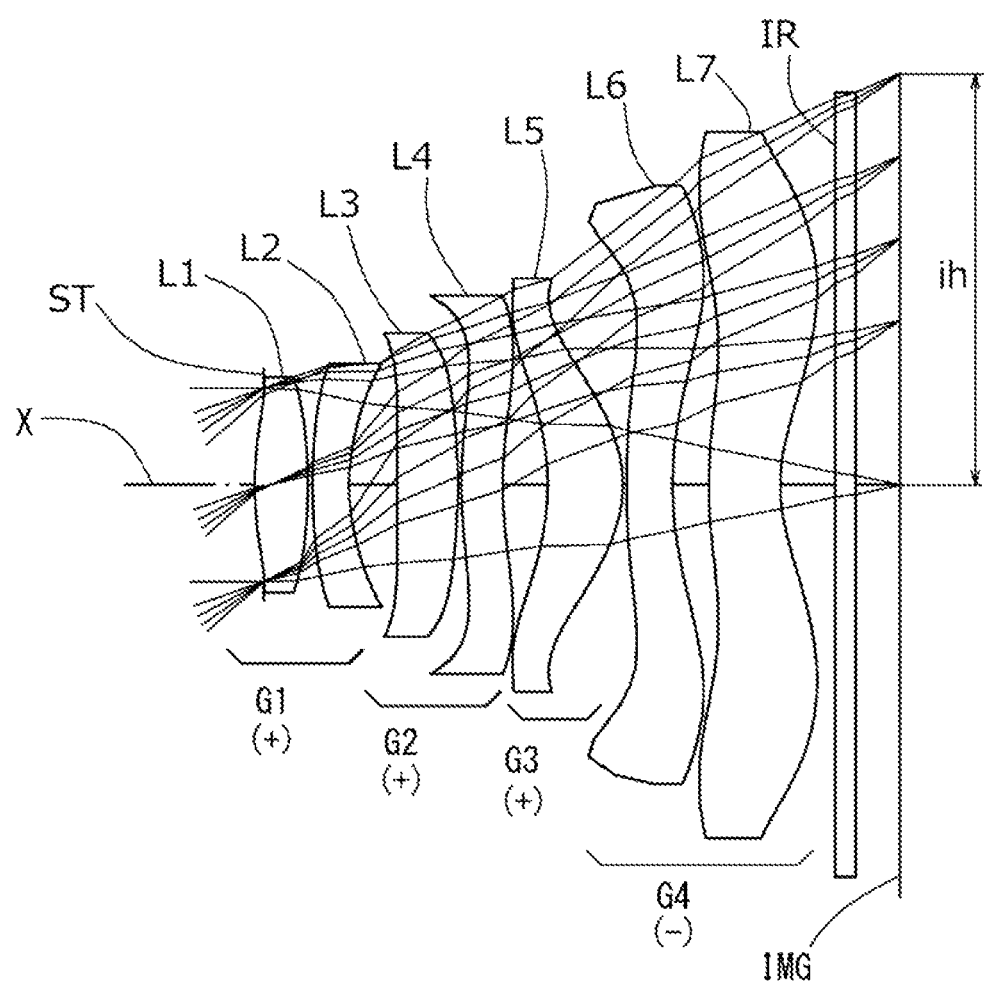
FIG. 5 is a schematic view showing the general configuration of an imaging lens in Example 3.

FIG. 4 shows various aberrations of the imaging lens in Example 2. As shown in FIG. 4, each aberration is corrected properly.

The imaging lens provides a wide field of view of 80 degrees or more and high brightness with an F-value of 2.4. The ratio of total track length TTL to maximum image height ih (TTL/2ih) is 0.80, so it achieves compactness though it uses seven constituent lenses.

The basic lens data of Example 3 is shown below in Table 3.

EXAMPLE 3

TABLE 3

Example 3
in mm f = 6.78
Fno = 2.41

TABLE 3-continued

Example 3
in mm

ω(°) = 41.1
ih = 5.99
TTL = 9.29

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.13 | | |
| 2* | 5.019 | 0.774 | 1.5438 | 55.57 |
| 3* | −6.745 | 0.068 | | |
| 4* | 8.549 | 0.532 | 1.6349 | 23.97 |
| 5* | 3.069 | 0.700 | | |
| 6* | 286.557 | 0.886 | 1.5346 | 56.16 |
| 7* | −8.403 | 0.053 | | |
| 8* | 7.117 | 0.600 | 1.6349 | 23.97 |
| 9* | 5.614 | 0.651 | | |
| 10* | −3.969 | 1.097 | 1.5346 | 56.16 |
| 11* | −1.906 | 0.053 | | |
| 12* | 11.711 | 0.670 | 1.6349 | 23.97 |
| 13* | 4.996 | 0.529 | | |
| 14* | 6.2287 | 1.042 | 1.5346 | 56.16 |
| 15* | 2.4479 | 0.800 | | |
| 16 | Infinity | 0.300 | 1.5640 | 51.30 |
| 17 | Infinity | 0.641 | | |
| Image Plane | Infinity | | | |

Constituent Lens Data

| Lens | Start Surface | Focal Length |
|---|---|---|
| 1 | 2 | 5.42 |
| 2 | 4 | −7.83 |
| 3 | 6 | 15.29 |
| 4 | 8 | −49.56 |
| 5 | 10 | 5.79 |
| 6 | 12 | −14.27 |
| 7 | 14 | −8.34 |

| Lens | Composite Focal Length |
|---|---|
| Third Lens-Fourth Lens | 20.81 |
| Sixth Lens-Seventh Lens | −4.95 |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | −7.763E−03 | 6.959E−03 | −3.606E−03 | −2.401E−02 | 1.186E−03 | 8.779E−03 | −1.347E−02 |
| A6 | −3.872E−03 | −5.264E−03 | 5.475E−03 | 9.046E−03 | −2.126E−03 | −2.563E−03 | 9.691E−04 |
| A8 | 4.450E−04 | 4.640E−04 | −1.164E−03 | −1.964E−03 | 4.475E−05 | −1.037E−04 | −1.584E−04 |
| A10 | −1.920E−04 | −8.594E−05 | 1.225E−04 | 1.736E−04 | 0.000E+00 | 0.000E+00 | −5.195E−06 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −2.633E+00 | 0.000E+00 | 0.000E+00 | 0.000E+00 | −5.411E+00 |
| A4 | −1.794E−02 | 5.886E−04 | −1.181E−02 | 4.673E−04 | −5.650E−03 | −1.406E−02 | −8.527E−03 |
| A6 | 1.660E−03 | 1.859E−03 | 1.900E−03 | −6.221E−04 | −1.948E−04 | 5.627E−04 | 4.941E−04 |
| A8 | −1.751E−04 | −3.802E−05 | 1.326E−04 | 1.822E−05 | 9.028E−06 | 6.413E−06 | −2.174E−05 |
| A10 | 6.551E−06 | −4.465E−06 | −1.209E−05 | −2.795E−06 | −1.947E−07 | −9.378E−07 | 5.371E−07 |
| A12 | 0.000E+00 | 0.000E+00 | −8.523E−07 | 1.742E−07 | 2.122E−08 | 1.374E−08 | −5.955E−09 |
| A14 | 0.000E+00 | 0.000E+00 | 5.879E−08 | 0.000E+00 | −8.130E−10 | 2.642E−10 | 3.567E−11 |
| A16 | 0.000E+00 | 0.000E+00 | 0.000E+00 | 0.000E+00 | 0.000E+00 | −5.954E−12 | 0.000E+00 |

As shown in Table 9, the imaging lens in Example 3 satisfies all the conditional expressions (1) to (15).

Figure 6:
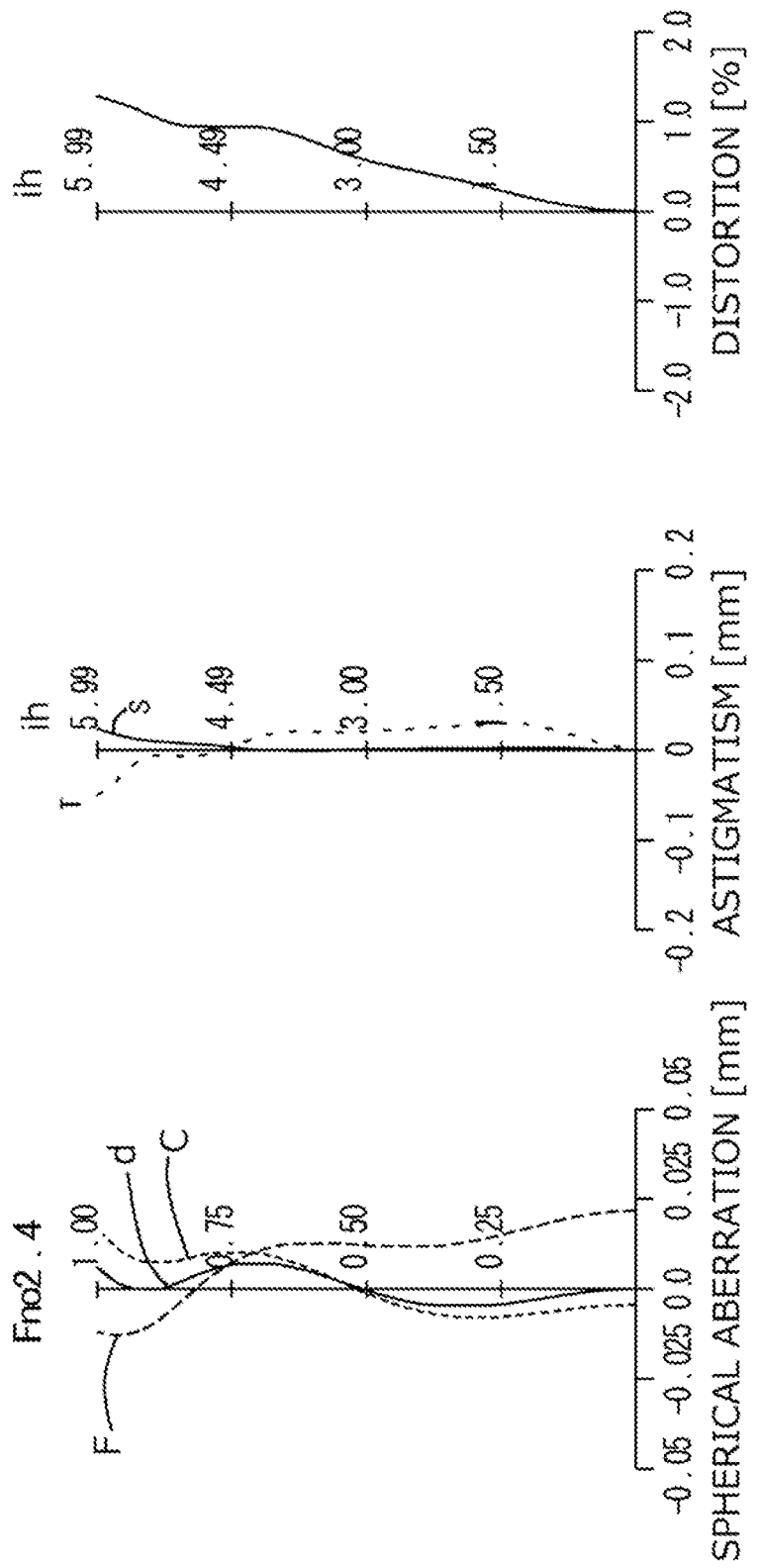
FIG. 6 shows spherical aberration, astigmatism, and distortion of the imaging lens in Example 3.
Figure 7:
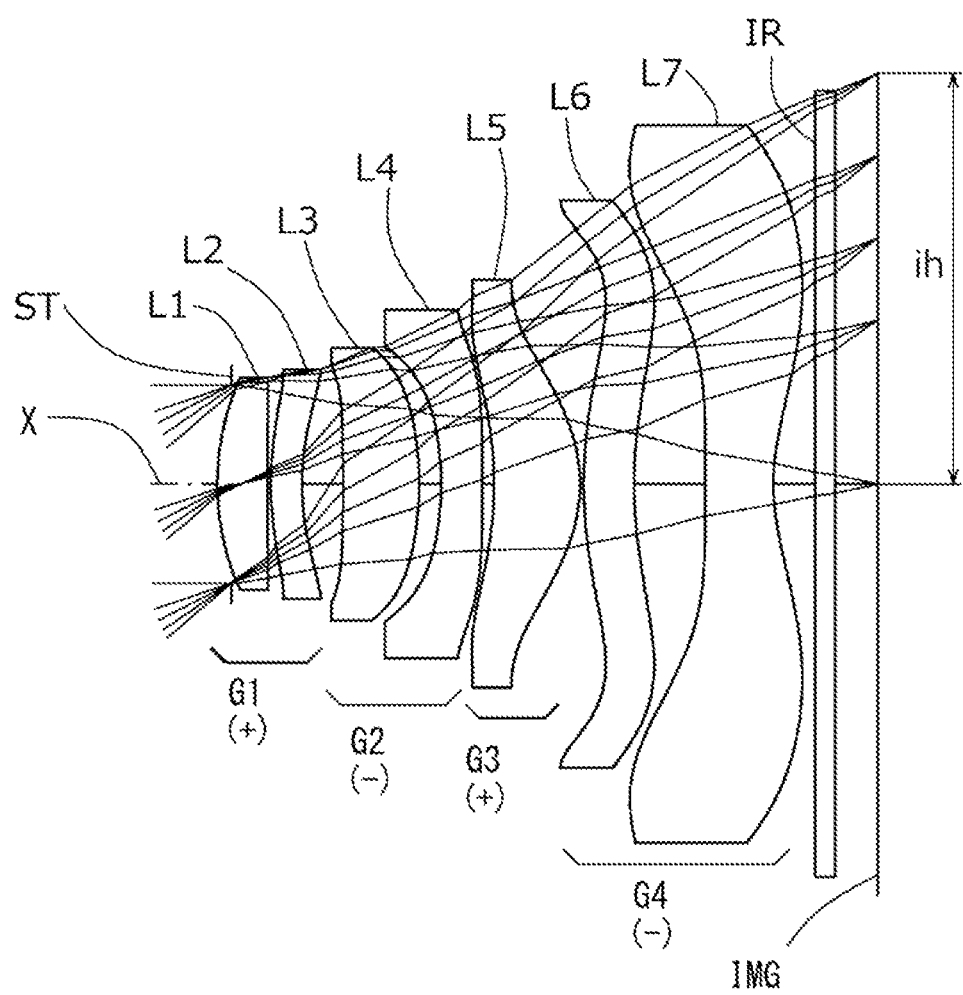
FIG. 7 is a schematic view showing the general configuration of an imaging lens in Example 4.

FIG. 6 shows various aberrations of the imaging lens in Example 3. As shown in FIG. 6, each aberration is corrected properly.

In addition, the imaging lens provides a wide field of view of 80 degrees or more and high brightness with an F-value of 2.4. The ratio of total track length TTL to maximum image height ih (TTL/2ih) is 0.78, so it achieves compactness though it uses seven constituent lenses.

EXAMPLE 4

The basic lens data of Example 4 is shown below in Table 4.

TABLE 4

Example 4
in mm f = 6.91
Fno = 2.40
ω(°) = 40.5
ih = 5.99
TTL = 9.51

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.2 | | |
| 2* | 3.909 | 0.727 | 1.5438 | 55.57 |
| 3* | 500.000 | 0.053 | | |
| 4* | 4.925 | 0.450 | 1.6349 | 23.97 |
| 5* | 3.448 | 0.603 | | |
| 6* | −57.008 | 1.105 | 1.5438 | 55.57 |
| 7* | −5.000 | 0.317 | | |
| 8* | −5.137 | 0.600 | 1.6349 | 23.97 |
| 9* | 113.766 | 0.173 | | |
| 10* | −5.583 | 1.255 | 1.5346 | 56.16 |
| 11* | −2.301 | 0.053 | | |
| 12* | 6.823 | 0.737 | 1.6349 | 23.97 |
| 13* | 6.696 | 1.028 | | |
| 14* | 44.7468 | 1.000 | 1.5346 | 56.16 |
| 15* | 3.2663 | 0.800 | | |
| 16 | Infinity | 0.300 | 1.5640 | 51.30 |
| 17 | Infinity | 0.422 | | |
| Image Plane | Infinity | | | |

Constituent Lens Data

| Lens | Start Surface | Focal Length |
|---|---|---|
| 1 | 2 | 7.24 |
| 2 | 4 | −20.54 |
| 3 | 6 | 10.00 |
| 4 | 8 | −7.73 |
| 5 | 10 | 6.46 |
| 6 | 12 | 451.08 |
| 7 | 14 | −6.65 |

| Lens | Composite Focal Length |
|---|---|
| Third Lens-Fourth Lens | −38.39 |
| Sixth Lens-Seventh Lens | −7.07 |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 2.504E−03 | 4.631E−03 | −1.322E−02 | −2.172E−02 | −8.638E−03 | −2.794E−03 | −1.772E−02 |
| A6 | −6.007E−04 | 1.143E−03 | 4.807E−03 | 4.213E−03 | −1.861E−03 | −2.571E−03 | −3.861E−04 |
| A8 | 5.905E−04 | −1.217E−03 | −2.279E−03 | −1.538E−03 | −2.196E−04 | −3.078E−04 | −4.941E−04 |
| A10 | −1.954E−04 | 2.229E−05 | 1.741E−04 | 1.088E−04 | 0.000E+00 | 0.000E+00 | 3.213E−05 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −2.803E+00 | 0.000E+00 | 0.000E+00 | 0.000E+00 | −6.299E+00 |
| A4 | −1.741E−02 | −1.542E−04 | −1.114E−02 | −1.283E−03 | −3.696E−03 | −1.326E−02 | −8.438E−03 |
| A6 | 1.286E−03 | 1.571E−03 | 1.826E−03 | −5.200E−04 | −2.537E−04 | 5.940E−04 | 5.314E−04 |

TABLE 4-continued

| | | | Example 4 in mm | | | | |
|---|---|---|---|---|---|---|---|
| A8 | −1.585E−04 | −4.206E−05 | 1.158E−04 | 2.243E−05 | 5.157E−06 | 7.406E−06 | −2.122E−05 |
| A10 | 2.416E−05 | −4.702E−06 | −1.314E−05 | −2.367E−06 | −1.905E−07 | −9.038E−07 | 4.927E−07 |
| A12 | 0.000E+00 | 0.000E+00 | −8.268E−07 | 1.112E−07 | 2.684E−08 | 1.326E−08 | −7.646E−09 |
| A14 | 0.000E+00 | 0.000E+00 | 6.918E−08 | 0.000E+00 | −5.278E−10 | 1.455E−10 | 7.431E−11 |
| A16 | 0.000E+00 | 0.000E+00 | 0.000E+00 | 0.000E+00 | 0.000E+00 | −3.430E−12 | 0.000E+00 |

As shown in Table 9, the imaging lens in Example 4 satisfies all the conditional expressions (1) to (15).

Figure 8:
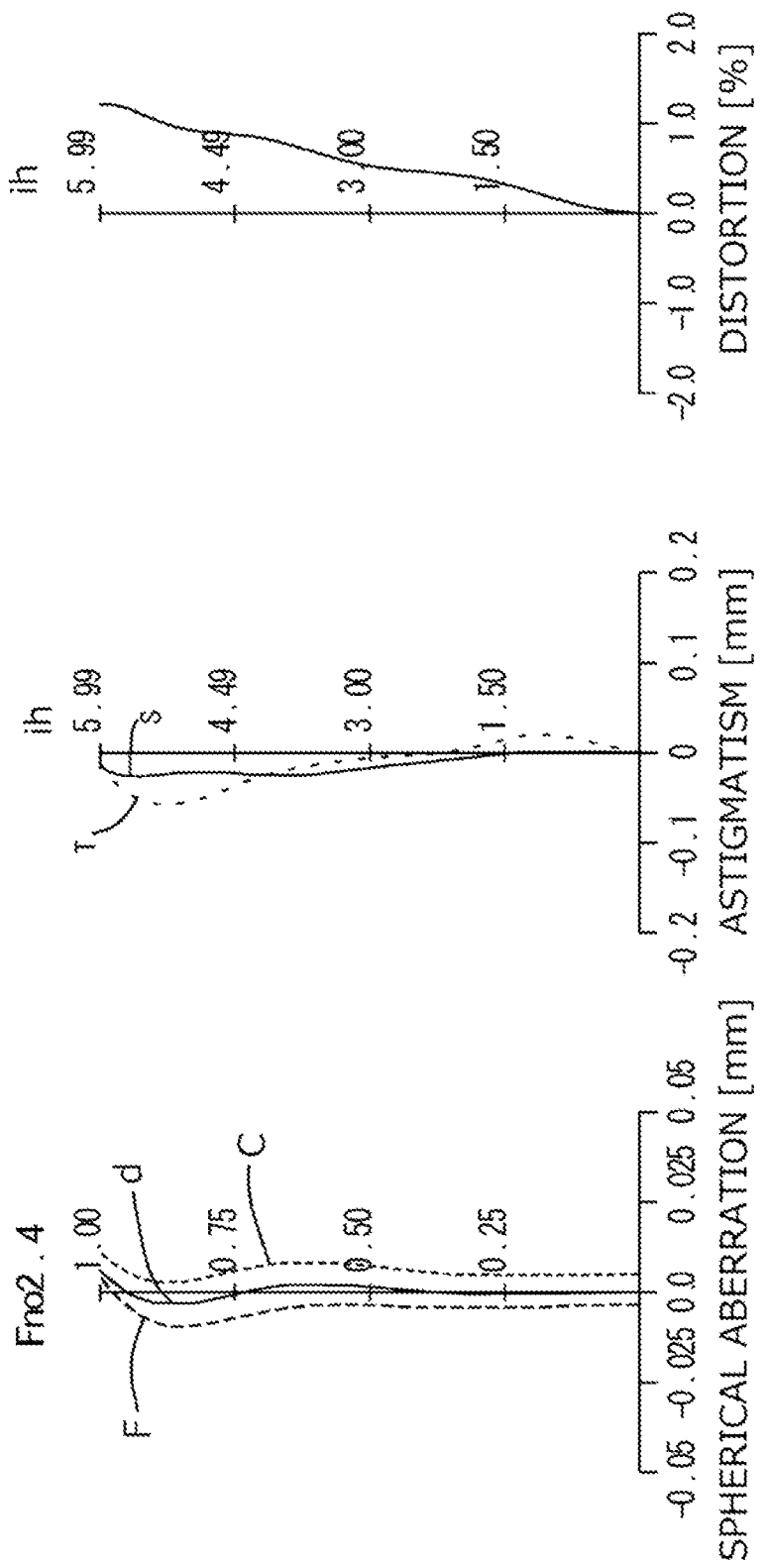
FIG. 8 shows spherical aberration, astigmatism, and distortion of the imaging lens in Example 4.
Figure 9:
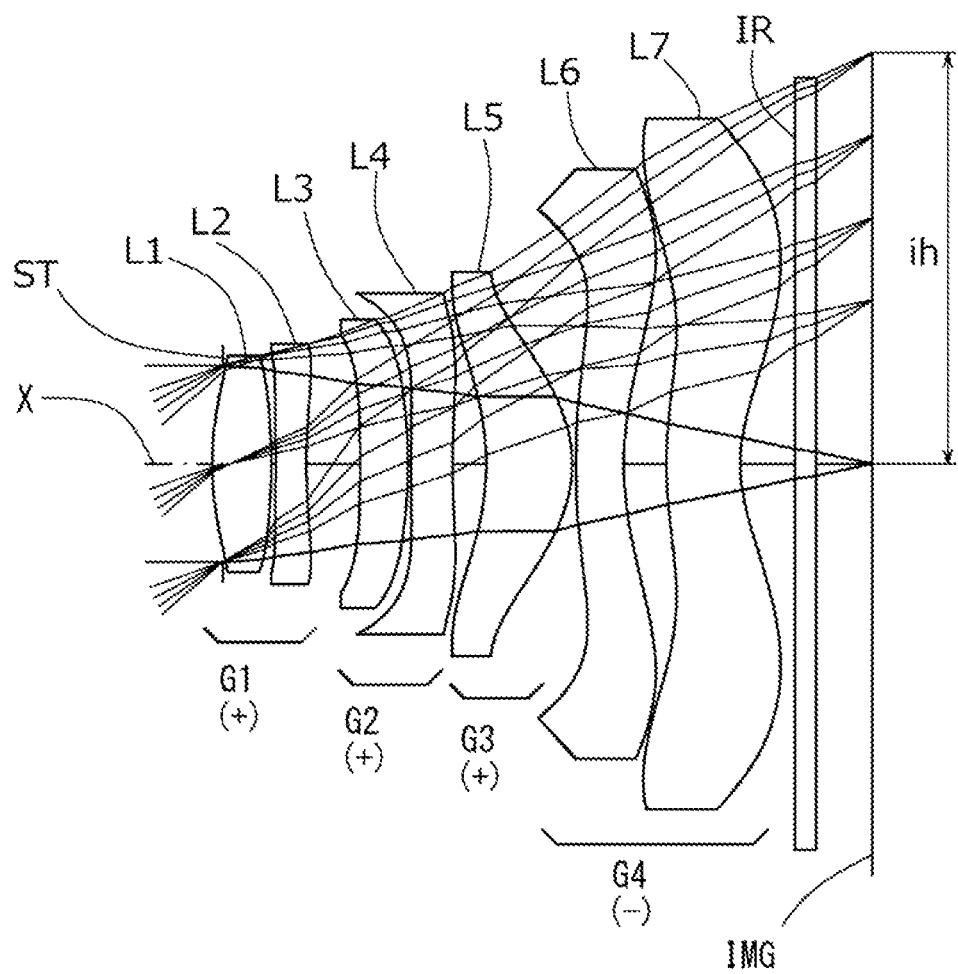
FIG. 9 is a schematic view showing the general configuration of an imaging lens in Example 5.

FIG. 8 shows various aberrations of the imaging lens in Example 4. As shown in FIG. 8, each aberration is corrected properly.

In addition, the imaging lens provides a wide field of view of 80 degrees or more and high brightness with an F-value of 2.4. The ratio of total track length TTL to maximum image height ih (TTL/2ih) is 0.79, so it achieves compactness though it uses seven constituent lenses.

EXAMPLE 5

The basic lens data of Example 5 is shown below in Table 5.

TABLE 5

Example 5
in mm f = 6.878
Fno = 2.40
ω(°) = 40.7
ih = 5.99
TTL = 9.51

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.15 | | |
| 2* | 4.675 | 0.859 | 1.5438 | 55.57 |
| 3* | −8.414 | 0.062 | | |
| 4* | −200.000 | 0.450 | 1.6349 | 23.97 |
| 5* | 7.659 | 0.786 | | |
| 6* | −21.168 | 0.691 | 1.5438 | 55.57 |
| 7* | −7.732 | 0.050 | | |
| 8* | 21.372 | 0.600 | 1.6349 | 23.97 |
| 9* | 9.658 | 0.490 | | |
| 10* | −3.936 | 1.255 | 1.5346 | 56.16 |
| 11* | −1.916 | 0.053 | | |
| 12* | 10.446 | 0.700 | 1.6349 | 23.97 |
| 13* | 4.872 | 0.620 | | |
| 14* | 5.8439 | 1.076 | 1.5346 | 56.16 |
| 15* | 2.3606 | 0.800 | | |
| 16 | Infinity | 0.300 | 1.5640 | 51.30 |
| 17 | Infinity | 0.825 | | |
| Image Plane | Infinity | | | |

Constituent Lens Data

| Lens | Start Surface | Focal Length |
|---|---|---|
| 1 | 2 | 5.66 |
| 2 | 4 | −11.61 |
| 3 | 6 | 22.00 |
| 4 | 8 | −28.32 |
| 5 | 10 | 5.74 |
| 6 | 12 | −15.12 |
| 7 | 14 | −8.30 |

| Lens | Composite Focal Length |
|---|---|
| Third Lens-Fourth Lens | 91.65 |
| Sixth Lens-Seventh Lens | −5.03 |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | −2.432E−03 | 4.564E−03 | −8.319E−03 | −2.155E−02 | −7.998E−03 | 2.520E−03 | −1.669E−02 |

TABLE 5-continued

Example 5
in mm

| | | | | | | | |
|---|---|---|---|---|---|---|---|
| A6 | −2.089E−03 | −2.681E−04 | 5.956E−03 | 5.035E−03 | −2.370E−03 | −2.179E−03 | 3.460E−04 |
| A8 | 7.323E−04 | −1.270E−03 | −2.557E−03 | −1.393E−03 | 6.397E−05 | −1.145E−04 | −3.424E−04 |
| A10 | −3.283E−04 | −5.908E−05 | 1.074E−04 | 1.608E−05 | 0.000E+00 | 0.000E+00 | 1.356E−05 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −2.666E+00 | 0.000E+00 | 0.000E+00 | 0.000E+00 | −4.955E+00 |
| A4 | −1.691E−02 | 1.727E−03 | −1.334E−02 | −3.078E−04 | −6.574E−03 | −1.543E−02 | −8.384E−03 |
| A6 | 9.317E−04 | 1.965E−03 | 1.895E−03 | −5.628E−04 | −9.109E−05 | 5.717E−04 | 4.834E−04 |
| A8 | −1.628E−04 | −4.420E−05 | 1.214E−04 | 1.934E−05 | 5.202E−06 | 7.067E−06 | −2.101E−05 |
| A10 | 2.288E−06 | −8.083E−06 | −1.279E−05 | −2.787E−06 | −2.477E−07 | −9.246E−07 | 4.973E−07 |
| A12 | 0.000E+00 | 0.000E+00 | −7.944E−07 | 1.451E−07 | 2.263E−08 | 1.347E−08 | −7.305E−09 |
| A14 | 0.000E+00 | 0.000E+00 | 7.298E−08 | 0.000E+00 | −7.679E−10 | 2.033E−10 | 8.752E−11 |
| A16 | 0.000E+00 | 0.000E+00 | 0.000E+00 | 0.000E+00 | 0.000E+00 | −4.363E−12 | 0.000E+00 |

As shown in Table 9, the imaging lens in Example 5 satisfies all the conditional expressions (1) to (15).

Figure 10:
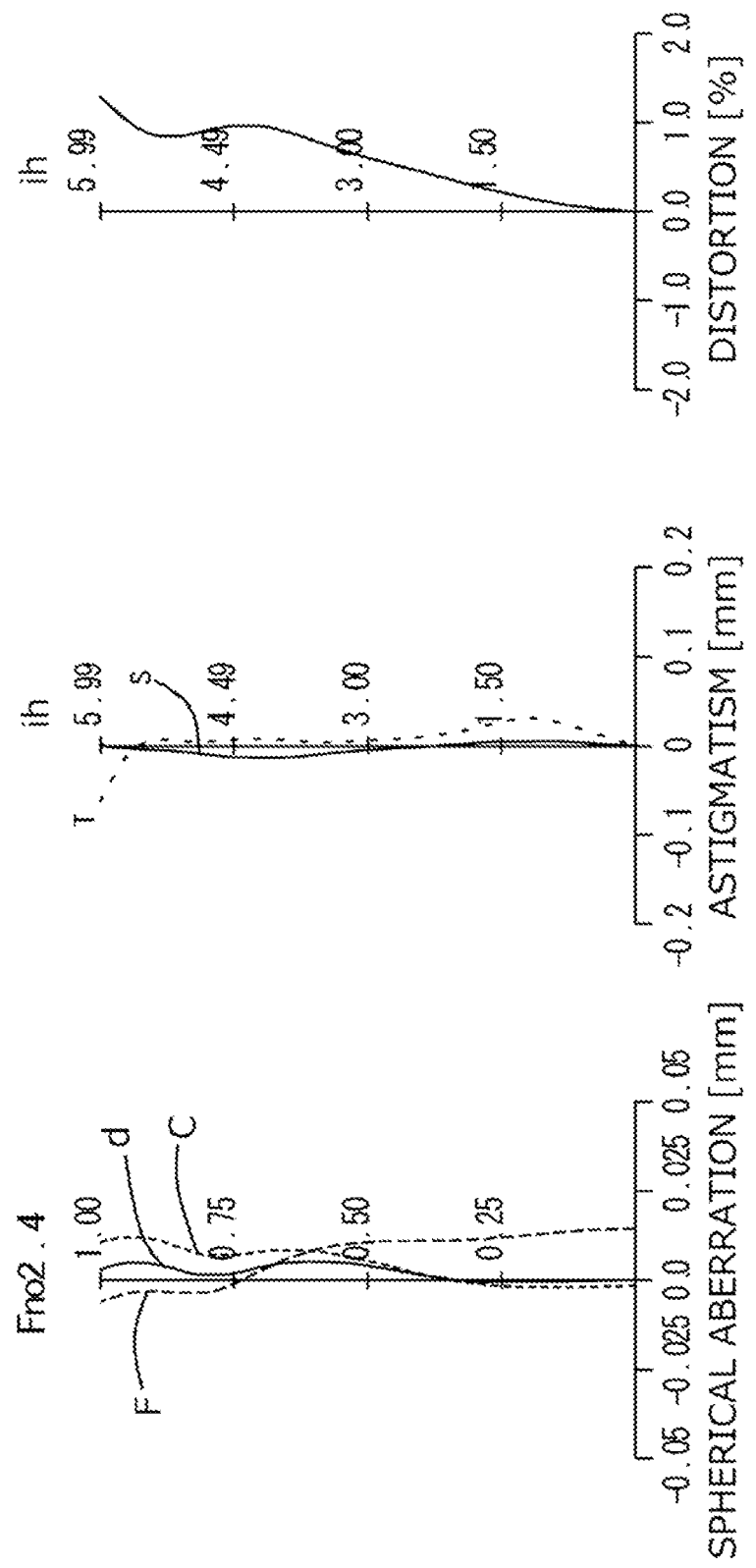
FIG. 10 shows spherical aberration, astigmatism, and distortion of the imaging lens in Example 5.
Figure 11:
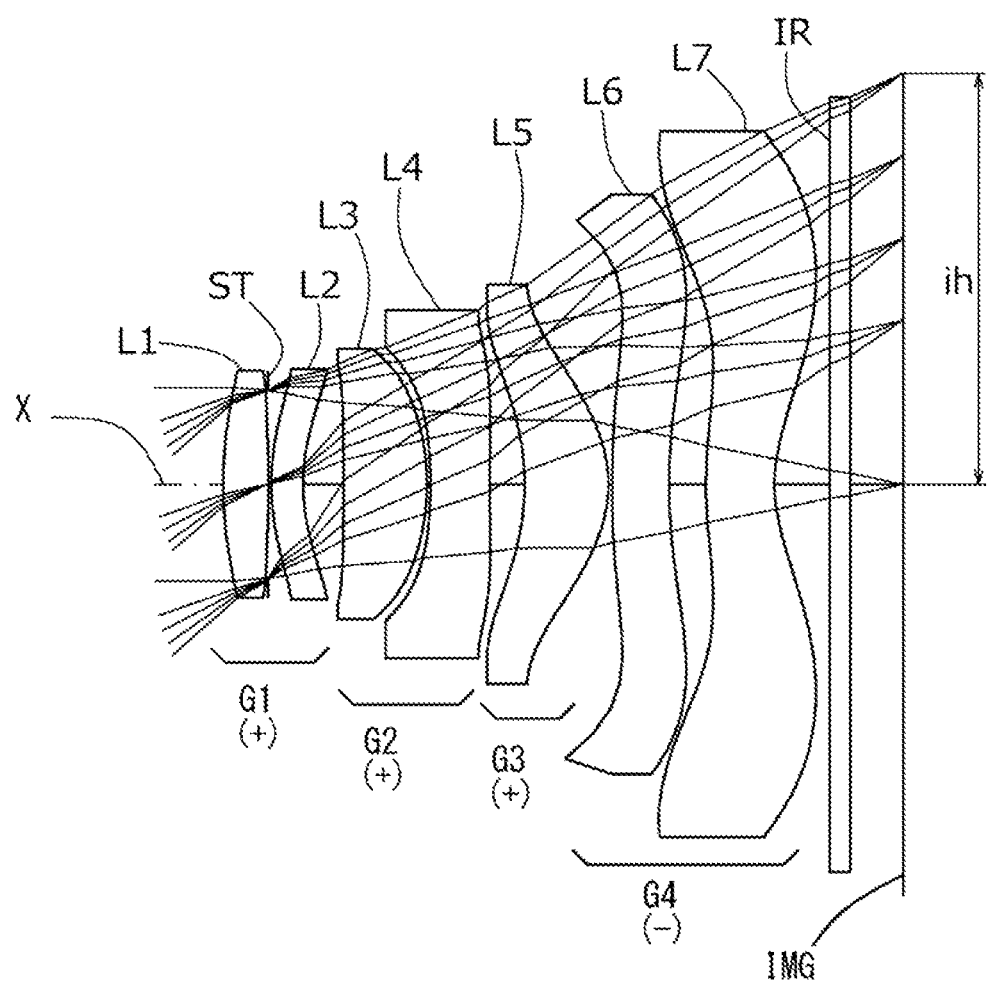
FIG. 11 is a schematic view showing the general configuration of an imaging lens in Example 6.

FIG. 10 shows various aberrations of the imaging lens in Example 5. As shown in FIG. 10, each aberration is corrected properly.

In addition, the imaging lens provides a wide field of view of 80 degrees or more and high brightness with an F-value of 2.4. The ratio of total track length TTL to maximum image height ih (TTL/2ih) is 0.79, so it achieves compactness though it uses seven constituent lenses.

EXAMPLE 6

The basic lens data of Example 6 is shown below in Table 6.

TABLE 6

Example 6
in mm f = 6.784
Fno = 2.41
ω(°) = 41.1
ih = 5.99
TTL = 9.79

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 6.551 | 0.656 | 1.5438 | 55.57 |
| 2* | −19.094 | −0.009 | | |
| 3 (Stop) | Infinity | 0.050 | | |
| 4* | 3.420 | 0.465 | 1.6142 | 25.58 |
| 5* | 2.777 | 0.592 | | |
| 6* | −61.014 | 1.211 | 1.5346 | 56.16 |
| 7* | −3.500 | 0.052 | | |
| 8* | −7.043 | 0.867 | 1.6142 | 25.58 |
| 9* | 20.788 | 0.503 | | |
| 10* | −3.693 | 1.224 | 1.5346 | 56.16 |
| 11* | −1.929 | 0.053 | | |
| 12* | 16.832 | 0.829 | 1.6142 | 25.58 |
| 13* | 7.928 | 0.537 | | |
| 14* | 6.4006 | 1.000 | 1.5346 | 56.16 |
| 15* | 2.3387 | 0.800 | | |
| 16 | Infinity | 0.300 | 1.5640 | 51.30 |
| 17 | Infinity | 0.773 | | |
| Image Plane | Infinity | | | |

Constituent Lens Data

| Lens | Start Surface | Focal Length |
|---|---|---|
| 1 | 1 | 9.05 |
| 2 | 4 | −33.18 |
| 3 | 6 | 6.89 |
| 4 | 8 | −8.46 |
| 5 | 10 | 6.08 |
| 6 | 12 | −25.30 |
| 7 | 14 | −7.54 |

TABLE 6-continued

Example 6
in mm

| Lens | Composite Focal Length |
|---|---|
| Third Lens-Fourth Lens | 34.16 |
| Sixth Lens-Seventh Lens | −5.61 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | 2.835E−03 | 4.028E−03 | −1.959E−02 | −2.873E−02 | −1.476E−03 | −4.280E−04 | −2.070E−02 |
| A6 | −1.993E−03 | −3.504E−04 | 4.377E−03 | 4.153E−03 | −1.217E−03 | −2.006E−03 | 5.450E−05 |
| A8 | 7.500E−04 | −4.328E−04 | −1.640E−03 | −1.392E−03 | −1.763E−04 | −2.511E−04 | −4.224E−04 |
| A10 | −1.947E−04 | −2.621E−05 | 7.274E−05 | 4.673E−05 | 0.000E+00 | 0.000E+00 | 5.841E−05 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −2.602E+00 | 0.000E+00 | 0.000E+00 | 0.000E+00 | −4.830E+00 |
| A4 | −1.648E−02 | 1.209E−03 | −1.182E−02 | 2.749E−03 | −3.373E−03 | −1.657E−02 | −8.723E−03 |
| A6 | 1.379E−03 | 1.954E−03 | 1.760E−03 | −7.283E−04 | −1.473E−04 | 6.112E−04 | 5.285E−04 |
| A8 | −1.328E−04 | −3.294E−05 | 1.226E−04 | 3.110E−05 | 5.120E−06 | 8.132E−06 | −2.169E−05 |
| A10 | 1.979E−05 | −4.819E−06 | −1.221E−05 | −1.901E−06 | −2.920E−07 | −9.332E−07 | 5.060E−07 |
| A12 | 0.000E+00 | 0.000E+00 | −8.281E−07 | 6.359E−08 | 2.409E−08 | 1.231E−08 | −6.843E−09 |
| A14 | 0.000E+00 | 0.000E+00 | 5.965E−08 | 0.000E+00 | −5.741E−10 | 2.203E−10 | 5.440E−11 |
| A16 | 0.000E+00 | 0.000E+00 | 0.000E+00 | 0.000E+00 | 0.000E+00 | −4.533E−12 | 0.000E+00 |

As shown in Table 9, the imaging lens in Example 6 satisfies all the conditional expressions (1) to (15).

Figure 12:
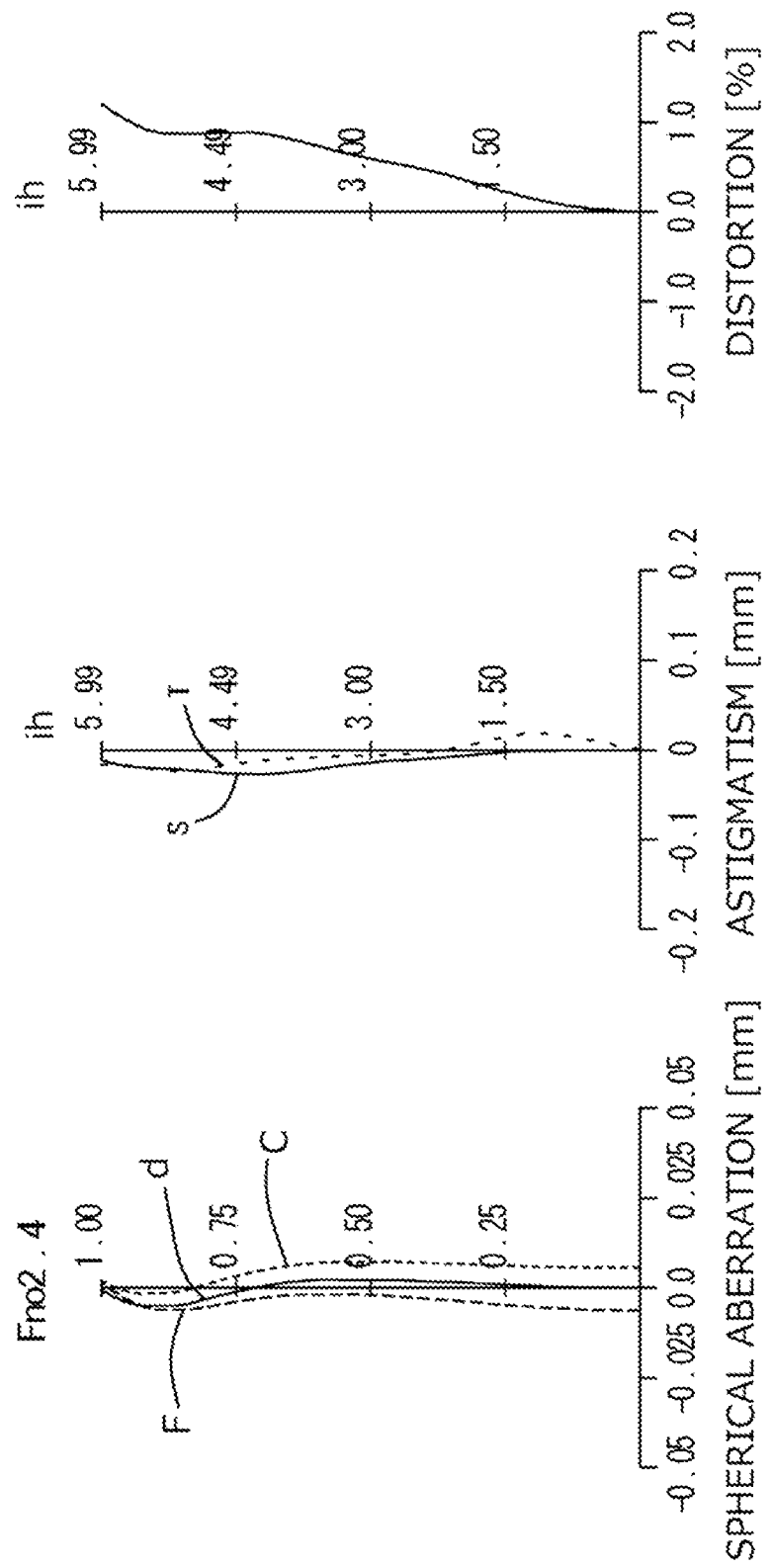
FIG. 12 shows spherical aberration, astigmatism, and distortion of the imaging lens in Example 6.
Figure 13:
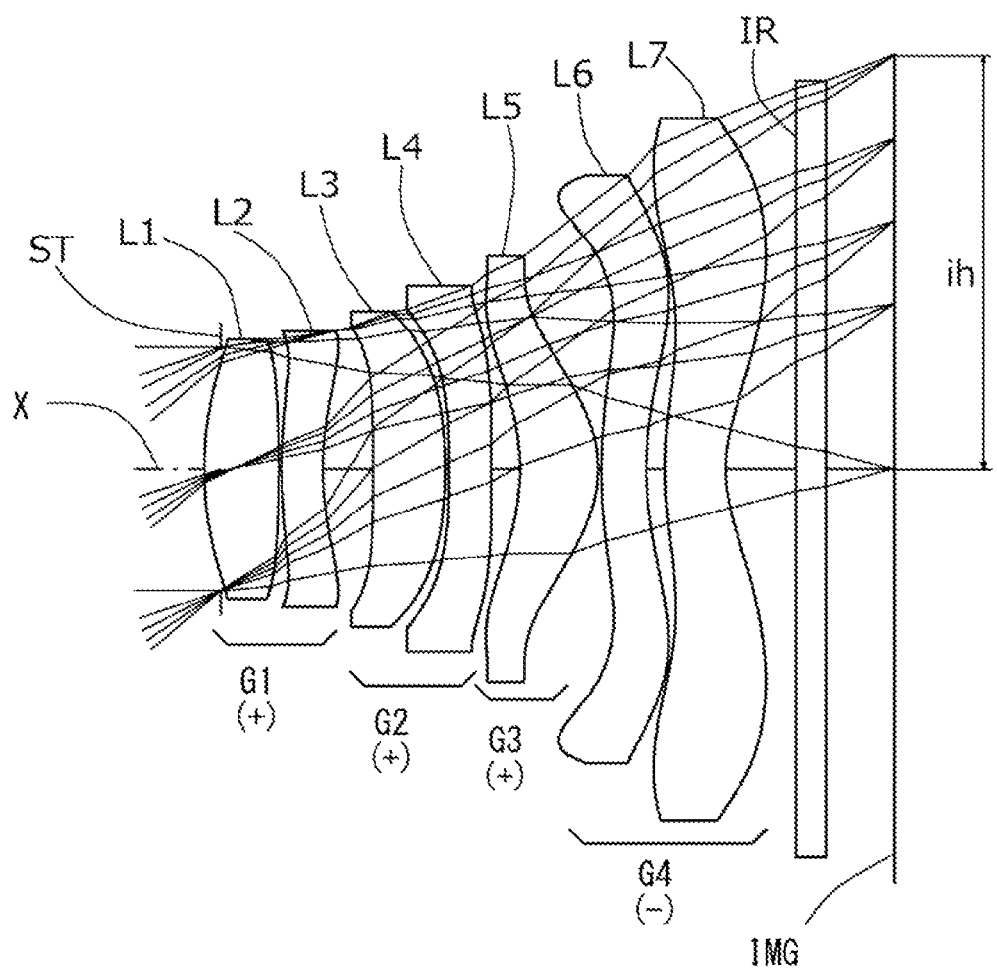
FIG. 13 is a schematic view showing the general configuration of an imaging lens in Example 7.

FIG. 12 shows various aberrations of the imaging lens in Example 6. As shown in FIG. 12, each aberration is corrected properly.

The imaging lens provides a wide field of view of 80 degrees or more and high brightness with an F-value of 2.4. The ratio of total track length TTL to maximum image height ih (TTL/2ih) is 0.82, so it achieves compactness though it uses seven constituent lenses.

EXAMPLE 7

The basic lens data of Example 7 is shown below in Table 7.

TABLE 7

Example 7
in mm f = 3.452
Fno = 2.01
ω(°) = 40.0
ih = 2.93
TTL = 4.82

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.12 | | |
| 2* | 2.409 | 0.531 | 1.5438 | 55.57 |
| 3* | −7.584 | 0.020 | | |
| 4* | 3.487 | 0.290 | 1.6349 | 23.97 |
| 5* | 1.921 | 0.360 | | |
| 6* | −21.075 | 0.509 | 1.5346 | 56.16 |
| 7* | −3.212 | 0.025 | | |
| 8* | −9.795 | 0.300 | 1.6349 | 23.97 |
| 9* | 47.382 | 0.204 | | |
| 10* | −1.594 | 0.554 | 1.5346 | 56.16 |
| 11* | −0.855 | 0.026 | | |
| 12* | 3.668 | 0.317 | 1.6349 | 23.97 |
| 13* | 2.395 | 0.131 | | |
| 14* | 2.8544 | 0.430 | 1.5346 | 56.16 |
| 15* | 1.0356 | 0.400 | | |
| 16 | Infinity | 0.210 | 1.5640 | 51.30 |
| 17 | Infinity | 0.589 | | |
| Image Plane | Infinity | | | |

TABLE 7-continued

Example 7
in mm

Constituent Lens Data

| Lens | Start Surface | Focal Length |
|---|---|---|
| 1 | 2 | 3.43 |
| 2 | 4 | −7.26 |
| 3 | 6 | 7.02 |
| 4 | 8 | −12.76 |
| 5 | 10 | 2.74 |
| 6 | 12 | −12.03 |
| 7 | 14 | −3.31 |

| Lens | Composite Focal Length |
|---|---|
| Third Lens-Fourth Lens | 15.60 |
| Sixth Lens-Seventh Lens | −2.56 |

Aspheric Surface Data

|  | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | −6.534E−04 | −1.764E−03 | −1.274E−01 | −1.846E−01 | −5.965E−02 | −8.331E−02 | −1.701E−01 |
| A6 | −2.111E−02 | 6.379E−02 | 1.520E−01 | 1.112E−01 | −8.220E−02 | −4.934E−02 | 2.576E−02 |
| A8 | 3.737E−02 | −1.818E−01 | −2.428E−01 | −1.432E−01 | 1.301E−02 | 1.734E−02 | −7.037E−03 |
| A10 | −5.338E−02 | 5.655E−02 | 6.957E−02 | 2.448E−02 | 0.000E+00 | 0.000E+00 | 2.402E−03 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

|  | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −2.790E+00 | 0.000E+00 | 0.000E+00 | 0.000E+00 | −5.955E+00 |
| A4 | −1.195E−01 | 8.022E−02 | −9.767E−02 | −4.089E−02 | −7.313E−02 | −1.260E−01 | −7.527E−02 |
| A6 | 4.895E−02 | 5.987E−02 | 8.116E−02 | −1.783E−02 | −6.540E−03 | 2.021E−02 | 2.177E−02 |
| A8 | −3.118E−02 | −4.834E−03 | 1.606E−02 | 4.733E−03 | 1.498E−03 | 1.023E−03 | −3.616E−03 |
| A10 | 1.489E−02 | −3.066E−03 | −9.396E−03 | −1.866E−03 | −2.527E−05 | −5.930E−04 | 2.765E−04 |
| A12 | 0.000E+00 | 0.000E+00 | −2.518E−03 | 3.970E−04 | 6.254E−05 | 3.388E−05 | −1.611E−05 |
| A14 | 0.000E+00 | 0.000E+00 | 8.407E−04 | 0.000E+00 | −1.195E−05 | 3.746E−06 | 1.267E−06 |
| A16 | 0.000E+00 | 0.000E+00 | 0.000E+00 | 0.000E+00 | 0.000E+00 | −3.570E−07 | 0.000E+00 |

As shown in Table 9, the imaging lens in Example 7 satisfies all the conditional expressions (1) to (15).

Figure 14:
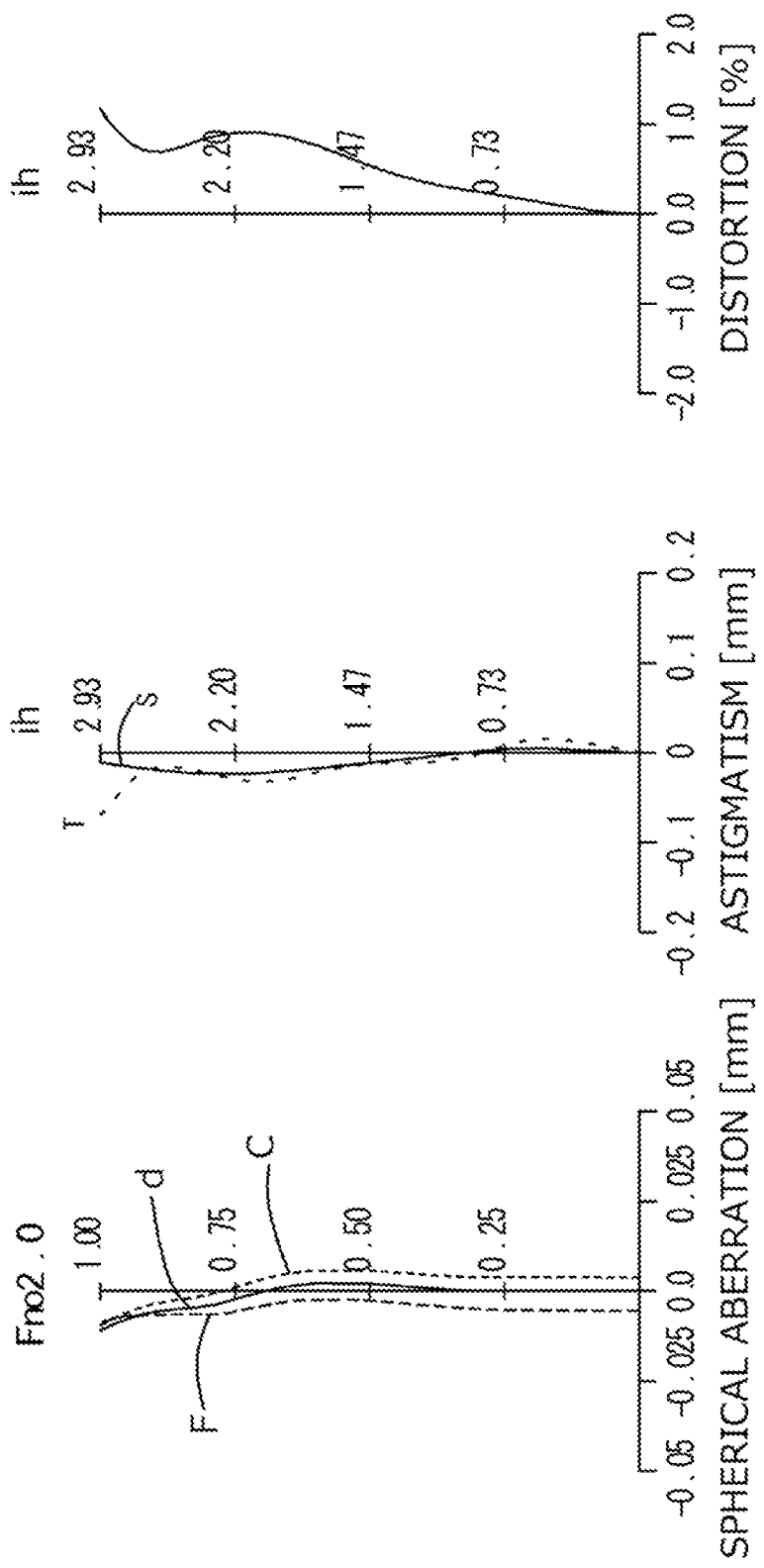
FIG. 14 shows spherical aberration, astigmatism, and distortion of the imaging lens in Example 7.
Figure 15:
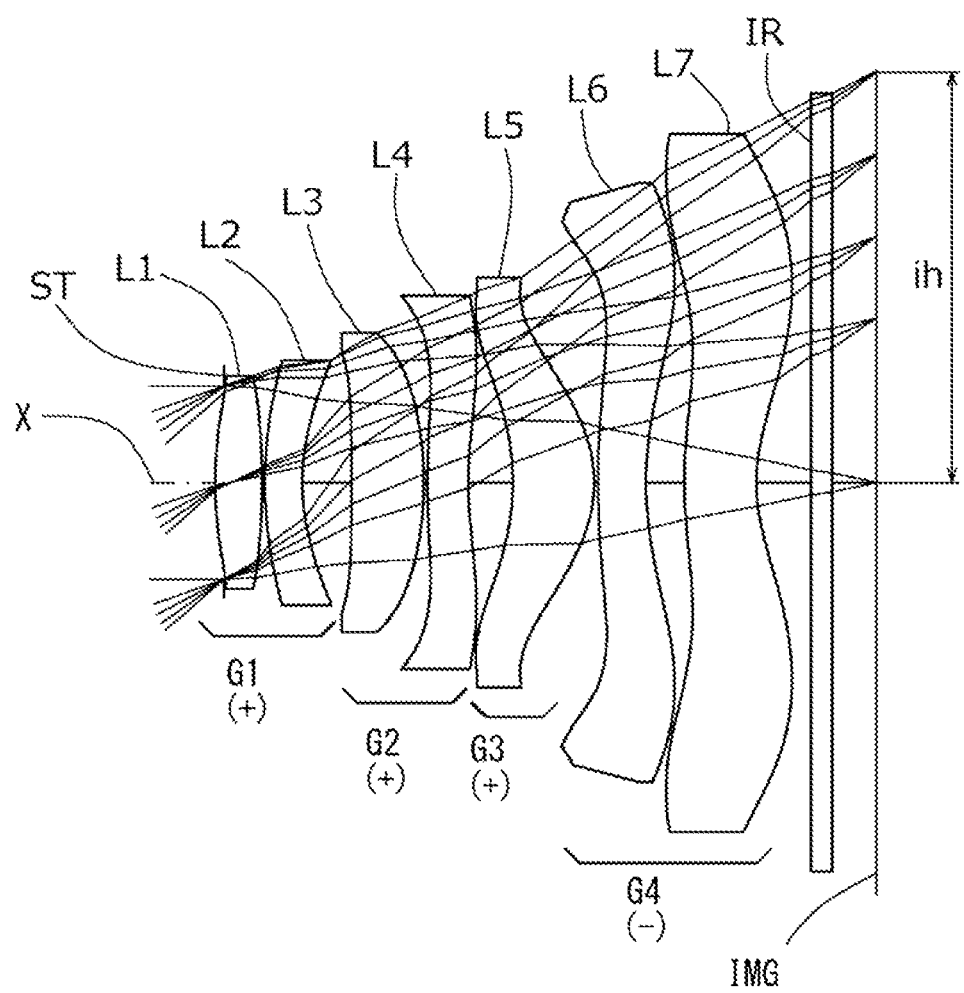
FIG. 15 is a schematic view showing the general configuration of an imaging lens in Example 8.

FIG. 14 shows various aberrations of the imaging lens in Example 7. As shown in FIG. 14, each aberration is corrected properly.

In addition, the imaging lens provides a wide field of view of 80 degrees or more and high brightness with an F-value of 2.0. The ratio of total track length TTL to maximum image height ih (TTL/2ih) is 0.82, so it achieves compactness though it uses seven constituent lenses.

EXAMPLE 8

The basic lens data of Example 8 is shown below in Table 8.

TABLE 8

Example 8
in mm f = 6.781
Fno = 2.41
ω(°) = 41.1
ih = 5.99
TTL = 9.53

Surface Data

| Surface No. i | Curvature Radius r | Surface Distance d | Refractive Index Nd | Abbe Number vd |
|---|---|---|---|---|
| (Object Surface) | Infinity | Infinity |  |  |
| 1 (Stop) | Infinity | −0.13 |  |  |
| 2* | 5.591 | 0.683 | 1.5438 | 55.57 |
| 3* | −9.809 | 0.040 |  |  |
| 4* | 5.913 | 0.545 | 1.6349 | 23.97 |
| 5* | 3.081 | 0.721 |  |  |
| 6* | −50.310 | 1.051 | 1.5438 | 55.57 |

TABLE 8-continued

Example 8
in mm

| | | | | |
|---|---|---|---|---|
| 7* | −5.000 | 0.050 | | |
| 8* | 10.044 | 0.600 | 1.6349 | 23.97 |
| 9* | 6.265 | 0.646 | | |
| 10* | −3.634 | 1.187 | 1.5438 | 55.57 |
| 11* | −1.933 | 0.053 | | |
| 12* | 12.725 | 0.700 | 1.6349 | 23.97 |
| 13* | 5.078 | 0.559 | | |
| 14* | 6.6328 | 1.048 | 1.5438 | 55.57 |
| 15* | 2.5287 | 0.800 | | |
| 16 | Infinity | 0.300 | 1.5640 | 51.30 |
| 17 | Infinity | 0.651 | | |
| Image Plane | Infinity | | | |

Constituent Lens Data

| Lens | Start Surface | Focal Length |
|---|---|---|
| 1 | 2 | 6.65 |
| 2 | 4 | −10.95 |
| 3 | 6 | 10.13 |
| 4 | 8 | −27.95 |
| 5 | 10 | 6.09 |
| 6 | 12 | −13.80 |
| 7 | 14 | −8.26 |

| Lens | Composite Focal Length |
|---|---|
| Third Lens-Fourth Lens | 15.02 |
| Sixth Lens-Seventh Lens | −4.84 |

Aspheric Surface Data

| | 2nd Surface | 3rd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | 0.000E+00 | 0.000E+00 |
| A4 | −4.481E−03 | 5.909E−03 | −7.624E−03 | −2.388E−02 | −1.587E−03 | 3.146E−03 | −1.446E−02 |
| A6 | −2.518E−03 | −2.178E−03 | 5.403E−03 | 7.201E−03 | −2.098E−03 | −2.274E−03 | 7.969E−04 |
| A8 | 6.727E−04 | −5.293E−04 | −1.979E−03 | −1.836E−03 | 4.720E−05 | −1.889E−05 | −1.764E−04 |
| A10 | −2.386E−04 | 3.757E−05 | 2.468E−04 | 1.481E−04 | 0.000E+00 | 0.000E+00 | 1.096E−05 |
| A12 | 0.000E+00 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −2.635E+00 | 0.000E+00 | 0.000E+00 | 0.000E+00 | −5.592E+00 |
| A4 | −1.687E−02 | 1.502E−03 | −1.141E−02 | −2.939E−03 | −6.354E−03 | −1.420E−02 | −8.556E−03 |
| A6 | 1.362E−03 | 2.005E−03 | 1.870E−03 | −5.167E−04 | −1.230E−04 | 5.713E−04 | 5.076E−04 |
| A8 | −1.744E−04 | −3.060E−05 | 1.255E−04 | 1.423E−05 | 7.868E−06 | 6.648E−06 | −2.127E−05 |
| A10 | 1.325E−05 | −4.709E−06 | −1.251E−05 | −2.682E−06 | −2.382E−07 | −9.358E−07 | 5.086E−07 |
| A12 | 0.000E+00 | 0.000E+00 | −8.425E−07 | 1.745E−07 | 2.180E−08 | 1.327E−08 | −6.517E−09 |
| A14 | 0.000E+00 | 0.000E+00 | 6.556E−08 | 0.000E+00 | −7.869E−10 | 2.601E−10 | 5.919E−11 |
| A16 | 0.000E+00 | 0.000E+00 | 0.000E+00 | 0.000E+00 | 0.000E+00 | −5.510E−12 | 0.000E+00 |

As shown in Table 9, the imaging lens in Example 8 satisfies all the conditional expressions (1) to (15).

Figure 16:
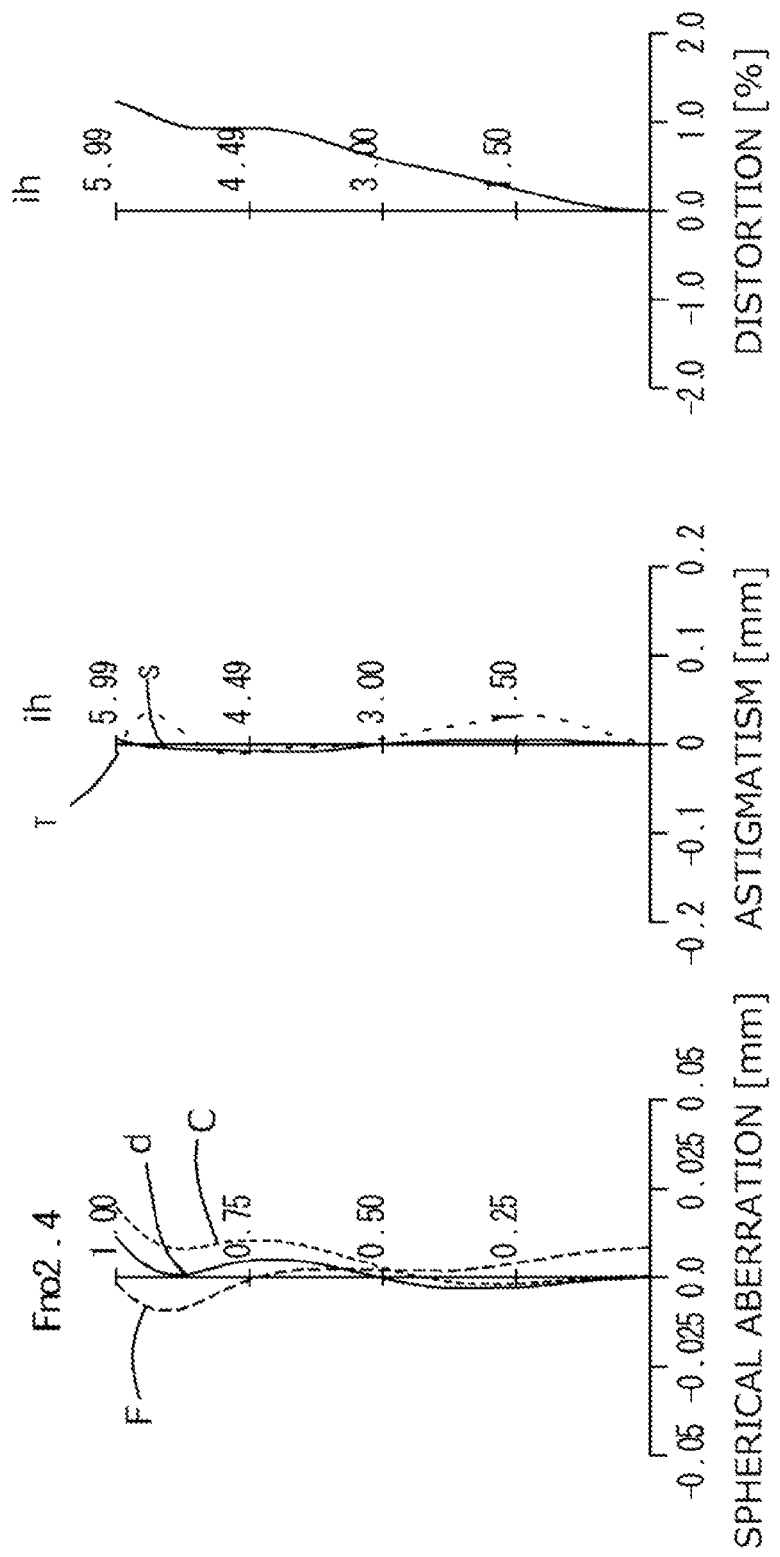
FIG. 16 shows spherical aberration, astigmatism, and distortion of the imaging lens in Example 8.

FIG. 16 shows various aberrations of the imaging lens in Example 8. As shown in FIG. 16, each aberration is corrected properly.

In addition, the imaging lens provides a wide field of view of 80 degrees or more and high brightness with an F-value of 2.4. The ratio of total track length TTL to maximum image height ih (TTL/2ih) is 0.79, so it achieves compactness though it uses seven constituent lenses.

As explained above, the imaging lenses according to this embodiment of the present invention realize an imaging lens system which provides a wide field of view of 80 degrees or more and high brightness with an F-value of 2.0 to 2.4 and corrects aberrations properly. In addition, the ratio of total track length TTL to maximum image height ih (TTL/2ih) is 0.85 or less, offering a compact lens system.

Table 9 shows data on Examples 1 to 8 in relation to the conditional expressions (1) to (15).

TABLE 9

| | Example 1 | Example 2 | Example 3 | Example 4 | Example 5 | Example 6 | Example 7 | Example 8 |
|---|---|---|---|---|---|---|---|---|
| Conditional Expression (1) 50 < vd1 < 70 | 55.57 | 55.57 | 55.57 | 55.57 | 55.57 | 55.57 | 55.57 | 55.57 |
| Conditional Expression (2) 20 < vd2 < 30 | 25.58 | 25.58 | 23.97 | 23.97 | 23.97 | 25.58 | 23.97 | 23.97 |

TABLE 9-continued

|  | Example 1 | Example 2 | Example 3 | Example 4 | Example 5 | Example 6 | Example 7 | Example 8 |
|---|---|---|---|---|---|---|---|---|
| Conditional Expression (3) $50 < vd3 < 70$ | 55.57 | 56.16 | 56.16 | 55.57 | 55.57 | 56.16 | 56.16 | 55.57 |
| Conditional Expression (4) $20 < vd4 < 30$ | 25.58 | 25.58 | 23.97 | 23.97 | 23.97 | 25.58 | 23.97 | 23.97 |
| Conditional Expression (5) $0.6 < TTL/2ih < 1.0$ | 0.83 | 0.80 | 0.78 | 0.79 | 0.79 | 0.82 | 0.82 | 0.79 |
| Conditional Expression (6) $0.85 < \Sigma_d/f < 1.25$ | 1.20 | 1.17 | 1.13 | 1.17 | 1.12 | 1.18 | 1.07 | 1.16 |
| Conditional Expression (7) $0.8 < ih/f < 1.2$ | 0.89 | 0.89 | 0.88 | 0.87 | 0.87 | 0.88 | 0.85 | 0.88 |
| Conditional Expression (8) $0.7 < f1/f < 1.5$ | 1.13 | 0.99 | 0.80 | 1.05 | 0.82 | 1.33 | 0.99 | 0.98 |
| Conditional Expression (9) $-5.0 < f2/f < -1.0$ | −2.03 | −2.04 | −1.16 | −2.97 | −1.69 | −4.89 | −2.10 | −1.61 |
| Conditional Expression (10) $2.0 < |f34/f|$ | 4.45 | 4.34 | 3.07 | 5.55 | 13.33 | 5.04 | 4.52 | 2.22 |
| Conditional Expression (11) $0.6 < f5/f < 1.2$ | 0.81 | 0.97 | 0.85 | 0.93 | 0.83 | 0.90 | 0.79 | 0.90 |
| Conditional Expression (12) $-1.2 < f67/f < -0.6$ | −0.80 | −0.86 | −0.73 | −1.02 | −0.73 | −0.83 | −0.74 | −0.71 |
| Conditional Expression (13) $50 < vd5 < 70$ | 56.16 | 56.16 | 56.16 | 56.16 | 56.16 | 56.16 | 56.16 | 55.57 |
| Conditional Expression (14) $20 < vd6 < 30$ | 25.58 | 25.58 | 23.97 | 23.97 | 23.97 | 25.58 | 23.97 | 23.97 |
| Conditional Expression (15) $50 < vd7 < 70$ | 56.16 | 56.16 | 56.16 | 56.16 | 56.16 | 56.16 | 56.16 | 55.57 |

The imaging lens composed of seven constituent lenses according to the present invention features compactness and a wide field of view and meets the demand for high resolution. Particularly when it is used in a highly functional product such as a smart TV or 4K TV, or an information terminal such as a game console or PC, or an increasingly compact and low-profile mobile terminal such as a smart phone, mobile phone or PDA (Personal Digital Assistant), it enhances the performance of the product in which it is mounted.

The effects of the present invention are as follows.

According to the present invention, it is possible to provide a high-brightness compact imaging lens which delivers higher optical performance than conventional imaging lenses when it is used not only in a conventional small image sensor but also in a large image sensor, and provides a wide field of view and can correct various aberrations properly.

What is claimed is:

1. An imaging lens in which elements are arranged in order from an object side to an image side, comprising:
    a first lens with positive refractive power having a convex surface on the object side near an optical axis;
    a second lens with negative refractive power having a concave surface on the image side near the optical axis;
    a third lens with positive refractive power having a convex surface on the image side near the optical axis;
    a fourth lens with negative refractive power having a concave surface on the image side near the optical axis;
    a fifth lens with positive refractive power as a meniscus lens having a convex surface on the image side near the optical axis;
    a sixth lens as a meniscus double-sided aspheric lens having a concave surface on the image side near the optical axis; and
    a seventh lens with negative refractive power as a double-sided aspheric lens having a concave surface on the image side near the optical axis.

2. The imaging lens according to claim 1, wherein conditional expressions (1) and (2) below are satisfied:

$$50 < vd1 < 70 \quad (1)$$

$$20 < vd2 < 30 \quad (2)$$

where
vd1: Abbe number of the first lens at d-ray
vd2: Abbe number of the second lens at d-ray.

3. The imaging lens according to claim 1, wherein conditional expressions (3) and (4) below are satisfied:

$$50 < vd3 < 70 \quad (3)$$

$$20 < vd4 < 30 \quad (4)$$

where
vd3: Abbe number of the third lens at d-ray
vd4: Abbe number of the fourth lens at d-ray.

4. The imaging lens according to claim 1, wherein an object-side surface and an image-side surface of the sixth lens are aspheric surfaces having a pole-change point in a position off the optical axis.

5. The imaging lens according to claim 1, wherein an image-side surface of the seventh lens is an aspheric surface having a pole-change point in a position off the optical axis.

6. The imaging lens according to claim 1, wherein a conditional expression (5) below is satisfied:

$$0.6 < TTL/2ih < 1.0 \quad (5)$$

where
TTL: distance on the optical axis from an object-side surface of an optical element located nearest to an object to an image plane without a filter or the like
ih: maximum image height.

7. The imaging lens according to claim 1, wherein a conditional expression (6) below is satisfied:

$$0.85 < \Sigma d/f < 1.25 \quad (6)$$

where
f: focal length of an overall optical system of the imaging lens
Σd: distance on the optical axis from the object-side surface of the first lens to the image-side surface of the seventh lens.

8. The imaging lens according to claim 1,
wherein a conditional expression (7) below is satisfied:

$$0.8 < ih/f < 1.2 \tag{7}$$

where
f: focal length of an overall optical system of the imaging lens
ih: maximum image height.

9. The imaging lens according to claim 1,
wherein conditional expressions (8) and (9) below are satisfied:

$$0.7 < f1/f < 1.5 \tag{8}$$

$$-5.0 < f2/f < -1.0 \tag{9}$$

where
f: focal length of an overall optical system of the imaging lens
f1: focal length of the first lens
f2: focal length of the second lens.

10. The imaging lens according to claim 1,
wherein a conditional expression (10) below is satisfied:

$$2.0 < |f34/f| \tag{10}$$

where
f: focal length of an overall optical system of the imaging lens
f34: composite focal length of the third lens and the fourth lens.

11. The imaging lens according to claim 1,
wherein conditional expressions (11) and (12) below are satisfied:

$$0.6 < f5/f < 1.2 \tag{11}$$

$$-1.2 < f67/f < -0.6 \tag{12}$$

where
f: focal length of an overall optical system of the imaging lens
f5: focal length of the fifth lens
f67: composite focal length of the sixth lens and the seventh lens.

12. The imaging lens according to claim 1,
wherein conditional expressions (13), (14), and (15) below are satisfied:

$$50 < vd5 < 70 \tag{13}$$

$$20 < vd6 < 30 \tag{14}$$

$$50 < vd7 < 70 \tag{15}$$

where
vd5: Abbe number of the fifth lens at d-ray
vd6: Abbe number of the sixth lens at d-ray
vd7: Abbe number of the seventh lens at d-ray.

* * * * *